US012687808B2

(12) United States Patent
Shimada

(10) Patent No.: US 12,687,808 B2
(45) Date of Patent: Jul. 21, 2026

(54) IMAGE FORMATION APPARATUS AND IMAGE FORMATION METHOD

(71) Applicant: Oki Electric Industry Co., Ltd., Tokyo (JP)

(72) Inventor: Takenori Shimada, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 18/739,099

(22) Filed: Jun. 10, 2024

(65) Prior Publication Data

US 2025/0036059 A1 Jan. 30, 2025

(30) Foreign Application Priority Data

Jul. 27, 2023 (JP) ................................ 2023-122457

(51) Int. Cl.

*G03G 15/00* (2006.01)
*G03G 15/01* (2006.01)
*G03G 15/043* (2006.01)
*G03G 15/06* (2006.01)
*G03G 15/20* (2006.01)

(52) U.S. Cl.

CPC ......... *G03G 15/50* (2013.01); *G03G 15/0189* (2013.01); *G03G 15/043* (2013.01); *G03G 15/065* (2013.01); *G03G 15/2039* (2013.01); *G03G 15/6585* (2013.01); *G03G 15/6591* (2013.01); *G03G 2215/00497* (2013.01)

(58) Field of Classification Search

CPC ....... G03G 15/506585; G03G 15/6591; G03G 2215/00497; G03G 2215/00502

See application file for complete search history.

(56) References Cited

U.S. PATENT DOCUMENTS

2002/0141770 A1* 10/2002 Shimura ............ G03G 15/5058 399/49
2004/0061325 A1* 4/2004 Lyen ...................... B42D 25/29 283/72
2013/0279958 A1* 10/2013 Yukie ................ G03G 15/6585 399/341
2015/0093553 A1* 4/2015 Tyagi ..................... G03G 15/01 428/207

(Continued)

FOREIGN PATENT DOCUMENTS

JP 2019-82517 A 5/2019

*Primary Examiner* — Carla J Therrien

(74) *Attorney, Agent, or Firm* — METROLEX IP LAW GROUP, PLLC; Robert L. Scott, Esq.

(57) ABSTRACT

An image formation apparatus according to an embodiment may include: a non-lustrous image formation unit; a lustrous image formation unit; and a controller configured to control the non-lustrous image formation unit to form a non-lustrous image of a non-lustrous developer on a first surface of a medium, and the lustrous image formation unit to form a lustrous image of a lustrous developer including a first region and a second region on a second surface opposite to the first surface, such that a difference between a first adhesion ratio and a second adhesion ratio is 18.75% or more and 37.50% or less, where the first adhesion ratio is an amount of the lustrous developer adhered to the medium per unit area in the first region, and the second adhesion ratio is an amount of the lustrous developer adhered to the medium per unit area in the second region.

16 Claims, 11 Drawing Sheets

(56) References Cited

U.S. PATENT DOCUMENTS

2015/0346622 A1* 12/2015 Itoh ...................... H04N 1/4095
399/39
2017/0235265 A1* 8/2017 Deno ................. G03G 15/6561
399/316

* cited by examiner

FIG. 3
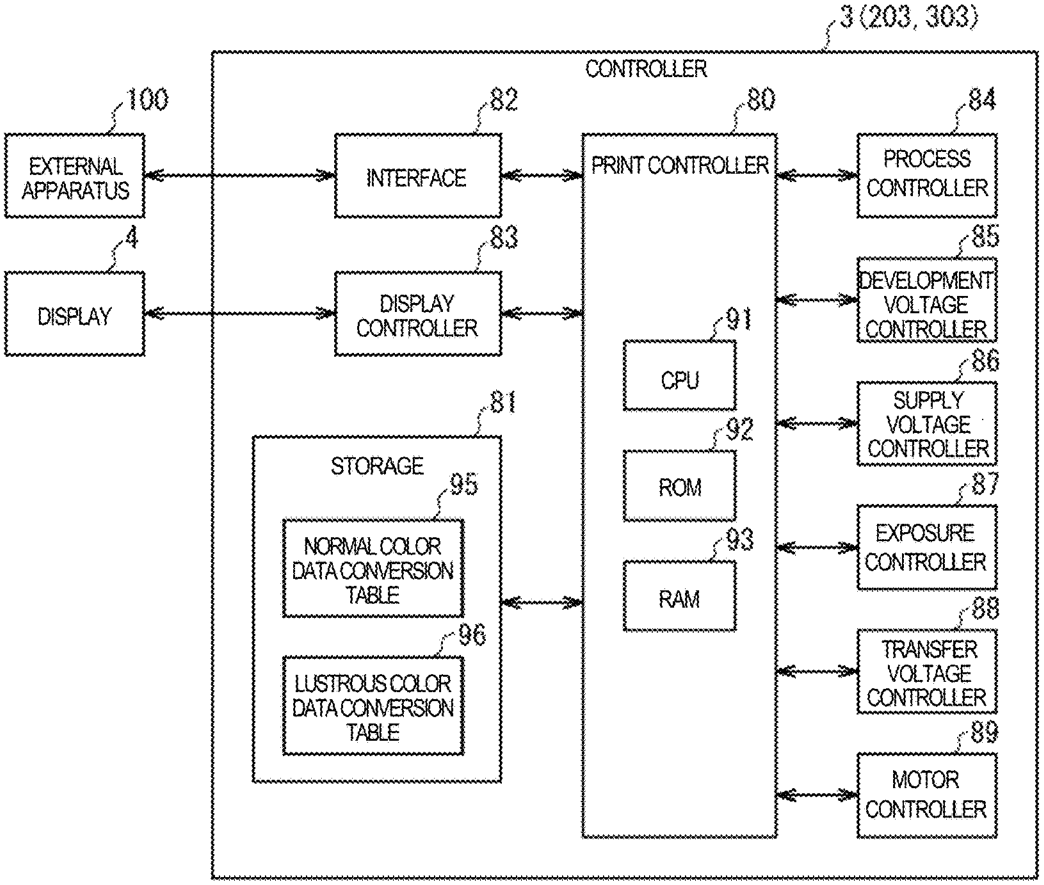
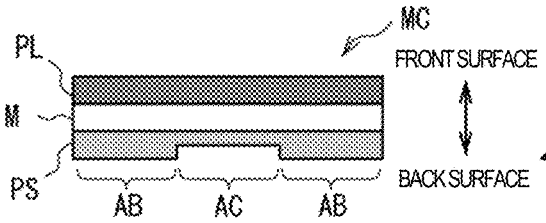
FIG. 4A
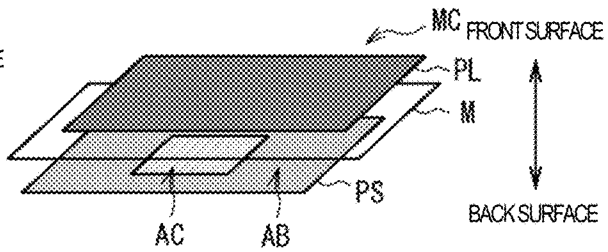
FIG. 4B
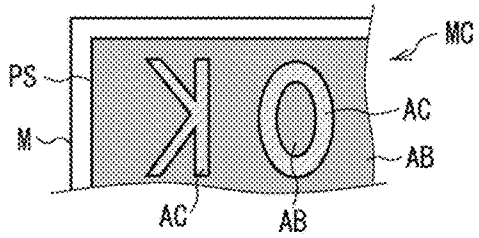
FIG. 4C

FIG. 7A

TBL1

| EVALUATION IMAGE | PRINT DUTY [%] | | | TONER ADHESION AMOUNT ON MEDIUM [mg/cm²] | | |
|---|---|---|---|---|---|---|
| | DECORATIVE PRINT DUTY DC | BACKGROUND PRINT DUTY DB | DUTY DIFFERENCE | DECORATIVE REGION AC | BACKGROUND REGION AB | DIFFERENCE |
| PE1 | 93.75 | 100 | 6.25 | 0.61 | 0.65 | 0.04 |
| PE2 | 87.50 | 100 | 12.50 | 0.57 | 0.65 | 0.08 |
| PE3 | 81.25 | 100 | 18.75 | 0.53 | 0.65 | 0.12 |
| PE4 | 75.00 | 100 | 25.00 | 0.49 | 0.65 | 0.16 |
| PE5 | 68.75 | 100 | 31.25 | 0.45 | 0.65 | 0.20 |
| PE6 | 62.50 | 100 | 37.50 | 0.41 | 0.65 | 0.24 |
| PE7 | 56.25 | 100 | 43.75 | 0.37 | 0.65 | 0.28 |
| PE8 | 50.00 | 100 | 50.00 | 0.33 | 0.65 | 0.32 |

FIG. 7B

TBL2

| EVALUATION IMAGE | ZERO-DEGREE REFLECTANCE (Y VALUE) [%] | | | LUMINOUS REFLECTANCE DIFFERENCE ΔY | | | |
|---|---|---|---|---|---|---|---|
| | DECORATIVE REGION AC | BACKGROUND REGION AD | DIFFERENCE | DECORATIVE REGION AC | BACKGROUND REGION AB | DIFFERENCE | DECREASE RATE [%] |
| PE1 | 27.62 | 28.53 | 0.91 | 32 | 36 | 4 | 11 |
| PE2 | 27.39 | 28.53 | 1.14 | 31 | 36 | 5 | 14 |
| PE3 | 27.00 | 28.53 | 1.53 | 28 | 36 | 8 | 22 |
| PE4 | 26.71 | 28.53 | 1.82 | 26 | 36 | 10 | 28 |
| PE5 | 23.72 | 28.53 | 4.81 | 24 | 36 | 12 | 33 |
| PE6 | 22.74 | 28.53 | 5.79 | 22 | 36 | 14 | 39 |
| PE7 | 21.01 | 28.53 | 7.52 | 19 | 36 | 17 | 47 |
| PE8 | 19.05 | 28.53 | 9.48 | 18 | 36 | 18 | 50 |

FIG. 7C

TBL3

| EVALUATION IMAGE | VISUAL JUDGMENT | | OVERALL EVALUATION |
|---|---|---|---|
| | FIRST VISUAL CONDITION | SECOND VISUAL CONDITION | |
| PE1 | × | × | × |
| PE2 | × | × | × |
| PE3 | × | ○ | ○ |
| PE4 | × | ○ | ◎ |
| PE5 | × | ○ | ◎ |
| PE6 | × | ○ | ○ |
| PE7 | ○ | ○ | × |
| PE8 | ○ | ○ | × |

IMAGE FORMATION APPARATUS AND IMAGE FORMATION METHOD

CROSS REFERENCE TO RELATED APPLICATIONS

This application claims priority based on 35 USC 119 from prior Japanese Patent Application No. 2023-122457 filed on Jul. 27, 2023, entitled "IMAGE FORMATION APPARATUS AND IMAGE FORMATION METHOD", the entire contents of which are incorporated herein by reference.

BACKGROUND

The disclosure may relate to an image formation apparatus and an image formation method that may be suitable for forming to a medium an image having a special visual effect using, for example, a lustrous color.

In a related art, there has been known an image formation apparatus that is configured to form (i.e., print) on a medium such as paper a color image using normal color toner such as toner of black, magenta, cyan, and yellow (hereinafter may be referred to as "normal colors"). Also there has been known an image formation apparatus that is configured to form (i.e., print) on a medium a lustrous image using a lustrous toner such as toner of silver or gold color (hereinafter may be referred to as a lustrous color) in addition to the normal color toner.

Further, there has been proposed an image formation apparatus that is configure to form (i.e., print) a lustrous image of a lustrous toner and a normal color image of a normal color toner superimposed on the lustrous image so as to obtain an image that provides a visual effect in which a hidden image is appearing and disappearing depending on a position of a viewpoint or the like (e.g., see Patent Document 1).

Patent Document 1: Japanese Patent Application Publication No. 2019-82517 (see FIGS. 2 and 3)

SUMMARY

However, the image that is printed by the image formation apparatus described above includes a region in which the lustrous toner is disposed and a region in which the lustrous toner is not disposed. For this reason, in the medium on which the normal color image is superimposed on the lustrous image, a step is formed along a boundary between the regions on the layer of the normal color toner, which constitutes the normal color image. Accordingly, the medium may have a problem that the hidden image can be unintentionally visible due to the step, making the visual effect insufficient.

An object of an embodiment of the disclosure may be to propose an image formation apparatus and an image formation method capable of realizing a good visual effect.

An aspect of an embodiment of the disclosure may be an image formation apparatus that may include: a non-lustrous image formation unit configured to form a non-lustrous image of a non-lustrous developer on a medium that at least partially transmits visible light; a lustrous image formation unit configured to form a lustrous image of a lustrous developer on the medium; and a controller configured to control, based on printing data, the non-lustrous image formation unit and the lustrous image formation unit, wherein the controller is configured to control the non-lustrous image formation unit to form the non-lustrous image on a first surface of the medium, and the lustrous image formation unit to form the lustrous image including a first region and a second region on a second surface, which is an opposite surface of the first surface, such that a difference between a first adhesion ratio and a second adhesion ratio is 18.75% or more and 37.50% or less, where the first adhesion ratio is an amount of the lustrous developer adhered to the medium per unit area in the first region, and the second adhesion ratio is an amount of the lustrous developer adhered to the medium per unit area in the second region.

Another aspect of an embodiment of the disclosure may be an image formation method that may include: forming, by a non-lustrous image formation unit, a non-lustrous image of a non-lustrous developer on a first surface of a medium that at least partially transmits visible light; and before or after the forming of the non-lustrous image, forming, by a lustrous image formation unit, a lustrous image of a lustrous developer including a first region and a second region on a second surface that is an opposite surface of the first surface of the medium. In the forming of the lustrous image, a difference between a first adhesion ratio and a second adhesion ratio is 18.75% or more and 37.50% or less, where the first adhesion ratio is an amount of the lustrous developer adhered to the medium per unit area in the first region, and the second adhesion ratio is an amount of the lustrous developer adhered to the medium per unit area in the second region.

Another aspect of an embodiment of the disclosure may be an image formation apparatus that may include: a first image formation unit configured to form a first image of a non-lustrous developer on a medium that at least partially transmits visible light; a second image formation unit configured to form a second image of a lustrous developer on the medium; and a controller configured to control, based on printing data, the first image formation unit and the second image formation unit. The controller is configured to control the first image formation unit to form the first image on a first surface of the medium, and the second image formation unit to form the second image including a first region and a second region on a second surface of the medium, which is an opposite surface of the first surface of the medium, such that a ratio of a second adhesion ratio to a first adhesion ratio is 62.50% or more and 81.25% or less, where the first adhesion ratio is an amount of the lustrous developer adhered to the medium per unit area in the first region, and the second adhesion ratio is an amount of the lustrous developer adhered to the medium per unit area in the second region.

Another aspect of an embodiment of the disclosure may be an image formation method that may include: forming, by a non-lustrous image formation unit, a non-lustrous image of a non-lustrous developer on a first surface of a medium that at least partially transmits visible light; and before or after the forming of the non-lustrous image, forming, by a lustrous image formation unit, a lustrous image of a lustrous developer including a first region and a second region on a second surface that is an opposite surface of the first surface of the medium. In the forming of the lustrous image, a rate of a second adhesion ratio to a first adhesion ratio is 62.50% or more and 81.25% or less, where the first adhesion ratio is an amount of the lustrous developer adhered to the medium per unit area in the first region, and the second adhesion ratio is an amount of the lustrous developer adhered to the medium per unit area in the second region.

Another aspect of an embodiment of the disclosure may be an image formation apparatus that may include: a non-lustrous image formation unit configured to form a non-lustrous image and a correction image of a non-lustrous developer on a medium; a lustrous image formation unit configured to form a lustrous image of a lustrous developer on the medium; and a controller configured to control, based on printing data, the non-lustrous image formation unit and the lustrous image formation unit. The controller is configured to control the non-lustrous image formation unit to form the correction image in a second region excluding a first region on a surface of the medium, and control the lustrous image formation unit to form the lustrous image including the first region and the second region superimposed on the correction image on the surface of the medium, and control the non-lustrous image formation unit to form the non-lustrous image superimposed on the lustrous image, such that a difference of a second adhesion ratio from a first adhesion ratio is set to 18.75% or more and 37.50% or less and an adhesion ratio of the correction image is set to a value same as the difference, where the first adhesion ratio is an amount of the lustrous developer adhered to the medium per unit area in the first region, and the second adhesion ratio is an amount of the lustrous developer adhered to the medium per unit area in the second region.

According to at least one of the aspects described above, the non-lustrous image is formed on the first surface of the medium and the lustrous image is formed on the second surface of the medium, such that the difference between the first adhesion ratio in the first region and the second adhesion ratio in the second region is controlled within the predetermined range. Accordingly. it may be possible to provide to a user who views the first surface of the medium, a visual effect such as providing transition between a state of visualizing the non-lustrous image while visualizing a boundary between the first region and the second region and a state of only visualizing the non-lustrous image without visualizing the boundary, depending on the positional relationship with the light source, the angle of the medium, and/or the like.

Accordingly, an image formation apparatus and an image formation method capable of achieving a good visual effect can be realized.

BRIEF DESCRIPTION OF DRAWINGS

FIG. 3 is a schematic block diagram illustrating a circuit configuration of the image formation apparatus;

FIGS. 4A to 4C are schematic diagrams illustrating a configuration of a decorative medium according to a first embodiment;

FIGS. 7A to 7C are tables illustrating print duties of evaluation images, and measured values, and evaluation results;

DETAILED DESCRIPTION

Figure 1:
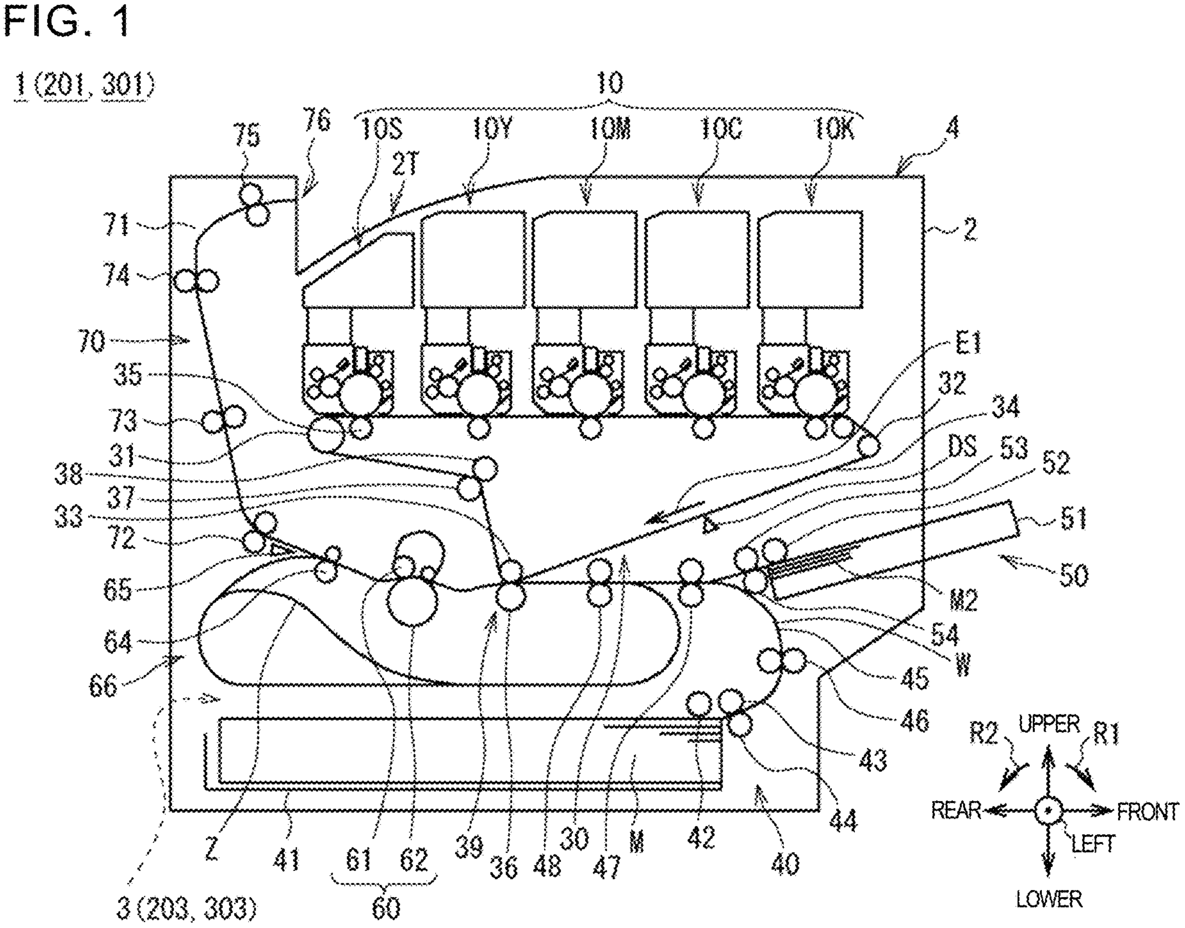
FIG. 1 is a diagram illustrating a schematic view illustrating a configuration of an image formation apparatus.

Descriptions are provided hereinbelow for embodiments based on the drawings. In the respective drawings referenced herein, the same constituents are designated by the same reference numerals and duplicate explanation concerning the same constituents is omitted. All of the drawings are provided to illustrate the respective examples only. Hereinafter, modes for carrying out the invention (hereinafter, referred to as embodiments) are described with reference to the drawings.

1. First Embodiment

1-1. Configuration of Image Formation Apparatus

As illustrated in a schematic side view of FIG. 1, an image formation apparatus 1 according to a first embodiment is an electrophotographic color printer and is configured to form (i.e., print) a color image on a medium M such as a paper sheet. Note that the image formation apparatus 1 illustrated in FIG. 1 is a single function printer (SFP) having a printer function, without having an image scanner function to read a document, a communication function using a telephone line, or the like.

The image formation apparatus 1 includes various parts arranged inside a housing 2 (an apparatus housing) substantially formed in a box shape. In the following description, the rightmost portion in FIG. 1 is the front of the image formation apparatus 1, and the vertical, horizontal, and front-rear directions are defined as seen facing the front.

A controller 3 controls an overall of the image formation apparatus 1. The controller 3 executes various processes by executing by reading predetermined programs as described later. The controller 3 is connected wirelessly or by wire to an external apparatus 100 (see FIG. 3) such as a computer device. When image data representing an image to be printed and an instruction to print the image date are provided by the external device, the controller 3 performs a printing process of forming a print image on the surface of the medium M. A display 4 (or a display unit 4) is, for example, a display device such as a liquid crystal panel, is disposed at a front portion of an upper surface of the housing 2. The display 4 displays various information based on the control of the controller 3.

At an upper portion in the housing 2, five image formation units 10K, 10C, 10M, 10Y and 10S are arranged in that order from the front side to the rear side. The image formation units 10K, 10C, 10M, 10Y, and 10S respectively correspond to a black color (K), a cyan color (C), a magenta color (M), a yellow color (Y), and a special color(S), but are different only in color and have the configuration same as each other.

Black (K), cyan (C), magenta (M) and yellow (Y) are all colors used in general color printers (hereinafter referred to as normal colors or non-lustrous colors). To the contrary, the special color(S) is, for example, like gold color or silver color, exhibits a metallic luster, i.e. a special color having luster (hereinafter may be referred to as a lustrous color). In addition to being used alone, this special color may be used over a normal color(s). In an embodiment, a silver color toner is used as a special color toner as an example. For convenience of explanation, the image formation units 10K, 10C, 10M, 10Y, and 10S may be hereinafter referred to as image formation units 10. In the following, the image formation units 10K, 10C, 10M, and 10Y are also referred to as non-lustrous image formation units or first image formation units, and the image formation unit 10S is also referred to as a lustrous image formation unit or a second image formation unit.

Figure 2:
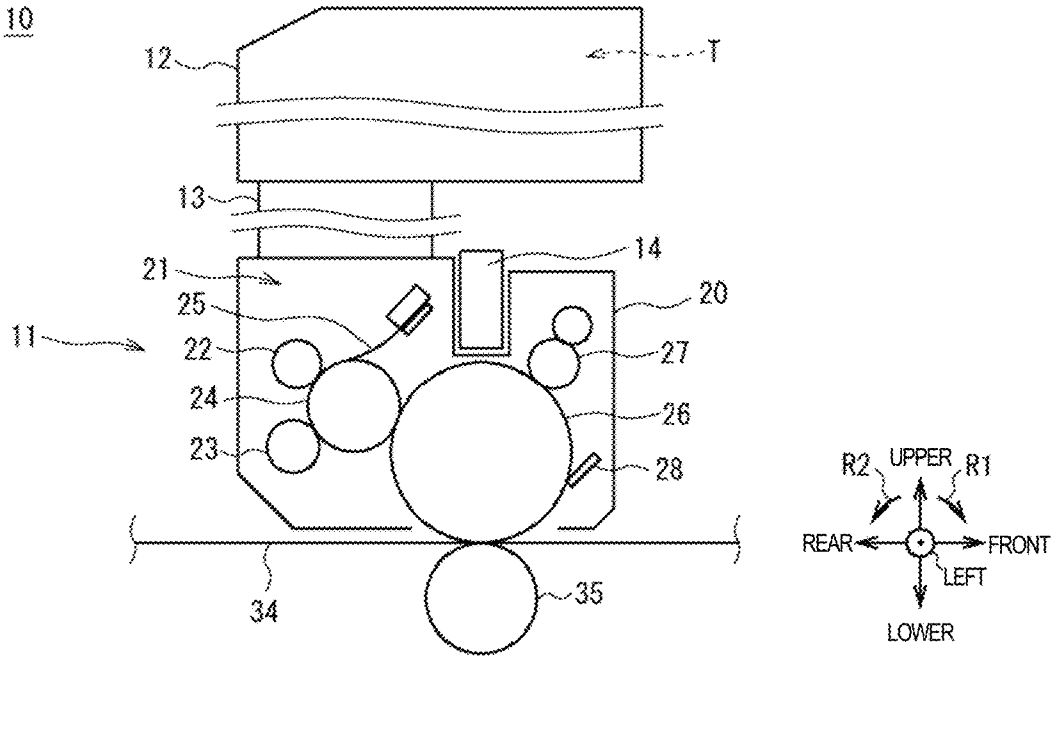
FIG. 2 is a diagram illustrating a schematic view illustrating a configuration of an image formation unit.

As illustrated in FIG. 2, the image formation unit 10 generally includes an image formation unit main part 11, a toner container 12, a toner supply part 13, and an LED (Light Emitting Diode) head 14. The toner container 12 includes toner T (also referred to as a developer) therein and is configured to be removably mounted to the image formation unit 10. Upon being mounted on the image formation unit 10, the toner container 12 is attached to the image formation unit main part 11 via the toner supply part 13. The toner container 12 may also be referred to as a toner cartridge.

As will be described later, in an embodiment, as the silver color toner T, toner containing a lustrous pigment is used. For convenience of explanation, the toner T of silver color, which is a lustrous color, may be referred to as silver toner TS, lustrous toner, or lustrous developer, hereinafter. As the toner T of yellow, magenta, cyan and black, toner containing organic pigments such as pigment yellow, pigment cyan, pigment magenta, carbon black, and the like are used. For ease of description, the toner T of yellow, magenta, cyan, and black (i.e., non-lustrous) may be hereinafter referred to as color toner TL, non-lustrous toner, or non-lustrous developer.

The image formation unit main part 11 (FIG. 2) are formed with an image formation unit casing 20, a toner storage room 21, a first supply roller 22, a second supply roller 23, a development roller 24, a development blade 25, a photosensitive drum 26, a charging roller 27, and a cleaning blade 28. Among these, each of the first supply roller 22, the second supply roller 23, the development roller 24, the photosensitive drum 26, and the charging roller 27 is configured in a cylindrical shape with a central axis along the left-right direction, and is rotatably supported by the image formation unit casing 20.

The toner storage room 21 accommodates therein the toner T supplied from the toner container 12 through the toner supply part 13. Each of the first supply roller 22 and the second supply roller 23 includes an elastic layer made of conductive urethane rubber foam or the like formed on the circumferential surface thereof. The development roller 24 includes, at the circumferential surface thereof, an elastic layer, a surface layer having conductivity, and the like. The development blade 25 is made of, for example, a stainless steel plate of a predetermined thickness. A part of the development blade 25 is in contact with the circumferential surface of the development roller 24, in a state where the development blade 25 slightly elastically deformed.

The photosensitive drum 26 serving as an image carrier includes a thin charge generation layer and a thin charge transport layer sequentially formed on the circumferential surface thereof, and thus is able to be charged. The charging roller 27 includes a conductive elastic member coating the circumferential surface thereof. The circumferential surface of the charging roller 27 is in contact with the circumferential surface of the photosensitive drum 26. The cleaning blade 28 is made of, for example, a thin sheet of resin. A part of the cleaning blade is in contact with the circumferential surface of the photosensitive drum 26 in a state where the cleaning blade 28 is slightly elastically deformed.

The LED head 14 serving as an exposure part or an exposure device is located above the photosensitive drum 26 of the image formation unit main part 11. The LED head 14 includes a plurality of light-emitting element chips arranged in a straight line along the left-right direction. The LED head 14 emits lights from light-emitting elements in a light emission pattern based on an image data signal supplied from the controller 3 (FIG. 1).

The image formation unit main part 11 rotates the first supply roller 22, the second supply roller 23, the development roller 24, and the charging roller 27 in the direction of the arrow R1 (clockwise in FIG. 2) and rotates the photosensitive drum 26 in the direction of the arrow R2 (counterclockwise in FIG. 2), with driving force being supplied from a motor(s) (not illustrated). Further, the image formation unit main part 11 applies, based on the control of the controller 3, predetermined bias voltages to the first supply roller 22, the second supply roller 23, the development roller 24, the development blade 25 and the charging roller 27, respectively, so as to charge them.

The first supply roller 22 and the second supply roller 23 adhere the toner T in the toner storage room 21 to the circumferential surfaces thereof by means of the charges thereof, and then adhere the toner T adhered thereon to the circumferential surface of the development roller 24 by means of the rotations thereof. The development blade 25 removes excess toner from the circumferential surface of the development roller 24 so as to form a thin layer of the toner on the circumferential surface of the development roller 24, and the rotation of the development roller 24 forwards the thin layer of the toner to bring in contact with the circumferential surface of the photosensitive drum 26.

To the contrary, the charging roller 27 with being charged contacts the photosensitive drum 26, so as to uniformly charge the circumferential surface of the photosensitive drum 26. The LED head 14 perform, according to the light emission pattern based on the image data signal supplied from the controller 3 (FIG. 1), an exposure processing to sequentially emit light at predetermined time intervals, so as to expose the photosensitive drum 26. As a result, an electrostatic latent image is formed on the circumferential surface of the photosensitive drum 26 in the vicinity of the upper end of the photosensitive drum 26.

Then, the rotation of the photosensitive drum 26 in the direction of the arrow R2 brings the portion where the electrostatic latent image is formed into contact with the development roller 24. Thus, the toner is adhered to the electrostatic latent image on the circumferential surface of the photosensitive drum 26, to develop a toner image based on the image data. The rotation of the photosensitive drum 26 further in the direction of the arrow R2 moves the toner image to reach the vicinity of the lower end of the photosensitive drum 26. For convenience of explanation, in the following, a toner image of the silver toner TS having luster may be referred to as a lustrous toner image PS or a lustrous image, and a toner image formed of one or more normal color toner TL may be referred to as a color toner image PL or a non-lustrous image.

An intermediate transfer section 30 is located below the image formation units 10 in the housing 2 (FIG. 1). The intermediate transfer section 30 is provided with a drive roller 31, a driven roller 32, a backup roller 33, an intermediate transfer belt 34, five primary transfer rollers 35, a secondary transfer roller 36, and a reverse bending roller 37. Of these, the drive roller 31, the driven roller 32, the backup roller 33, each of the primary transfer rollers 35, the secondary transfer roller 36, and the reverse bending roller 37 are all formed in a cylindrical shape with a central axis extending along the left-right direction, and are rotatably supported by the housing 2.

The drive roller 31 is disposed on the rear lower side of the image formation unit 10S, and is rotated in the direction of the arrow R1 when the drive force is supplied from a belt motor (not illustrated). The driven roller 32 is located on the front lower side of the image formation unit 10K. The upper ends of the drive roller 31 and the driven roller 32 are located at the same height as or slightly lower than the lower ends of the photosensitive drums 26 (FIG. 2) of the image formation units 10. The backup roller 33 is located on the front lower side of the drive roller 31 and on the rear lower side of the driven roller 32.

The intermediate transfer belt 34 is an endless belt composed of a high resistance plastic film and is wound and suspended around the drive roller 31, the driven roller 32, and the backup roller 33. In the intermediate transfer section 30, the five primary transfer rollers 35 are provided below an upper line of the intermediate transfer belt 34 stretched between the drive roller 31 and the driven roller 32, i.e., directly below the five image formation units 10 respectively, in such a manner that the five primary transfer rollers 35 are respectively opposed to the five photosensitive drums 26 of the image formation units 10 across the upper line of the intermediate transfer belt 34. The predetermined bias voltage is applied to the primary transfer rollers 35 based on the control of the controller 3.

The secondary transfer roller 36 is located directly below the backup roller 33 and is biased toward the backup roller 33. That is, the intermediate transfer section 30 sandwiches the intermediate transfer belt 34 between the secondary transfer roller 36 and the backup roller 33. A predetermined bias voltage is applied to the secondary transfer roller 36. The secondary transfer roller 36 and the backup roller 33 may be collectively referred to as a secondary transfer part 39.

The reverse bending roller 37 is located at a location near the lower front side of the drive roller 31 and the upper rear side of the backup roller 33, and biases the intermediate transfer belt 34 in the upper front direction. As a result, the intermediate transfer belt 34 is in a state in which tension is applied between the rollers without any slack. Also, a reverse bending backup roller 38 is provided on the front upper side of the reverse bending roller 37 and opposed to the reverse bending roller 37 across the intermediate transfer belt 34.

The intermediate transfer section 30 rotates the drive roller 31 in the direction of the arrow R1 by the driving force supplied from the belt motor (not illustrated), which causes the intermediate transfer belt 34 to run in the direction along the arrow E1. Each primary transfer roller 35 also rotates in the direction of the arrow R1 with the predetermined bias voltage being applied. This enables the image formation units 10 to transfer the toner images that have been reached to the lower ends on the circumferential surfaces of the photosensitive drums 26 (FIG. 2) to the intermediate transfer belt 34, to sequentially overlap the toner images of the respective colors on the intermediate transfer belt 34. With this, the toner images of the respective colors are sequentially superimposed on the surface of the intermediate transfer belt 34, starting with the toner image of silver(S) on the most upstream side. The intermediate transfer section 30 runs the intermediate transfer belt 34, which causes the toner image transferred from each of the image formation units 10 to reach the vicinity of the backup roller 33.

By the way, a conveyance path W, which is a path for conveying a medium M, is formed inside the housing 2 (FIG. 1). In the housing 2, the conveyance path W extends from near the front lower end of the housing 2 in a front-upward direction, carves about half a turn, and then extends therefrom in the rear direction beneath the intermediate transfer section 30. The conveyance path W extends therefrom in the upper direction along the back sides of the intermediate transfer section 30 and the image formation unit 10S, and then extends in the front direction. In other words, the conveyance path W is formed in like a capital letter “S” in FIG. 1. Inside the housing 2, various parts are arranged along the conveyance path W.

A first medium feeder 40 is disposed in the vicinity of the lower end in the housing 2 (FIG. 1). The first medium feeder 40 is provided with a media cassette 41 (or a paper cassette 41), a pickup roller 42, a feed roller 43, a retard roller 44, a conveyance guide 45, and pairs of conveyance rollers 46, 47, and 48, and the like. Note that the pickup roller 42, the feed roller 43, the retard roller 44, and the conveyance rollers 46, 47, and 48 are all formed in a cylindrical shape with a central axis extending along the left-right direction.

The media cassette 41 is configured in a hollow rectangular parallelepiped shape and is removably attached to the housing 2. The media cassette 41 stores therein the media M in a stacked state with surfaces of the media M oriented in the vertical direction. In an embodiment, as the medium M, so-called OHP (overhead projector) film, for example, CG3700 (3M Japan K.K.) is used. This medium M is a transparent film-like medium through which transmittance of visible light is sufficiently high.

The pickup roller 42 is in contact with a front end portion of an upper surface of an uppermost sheet of medium M in the media cassette 41. The feed roller 43 is disposed in front of the pickup roller 42 with a short distance therebetween. The retard roller 44 is located below the feed roller 43 and forms a gap equivalent to the thickness of a sheet of medium M between the feed roller 43 and the retard roller 44.

The first medium feeder 40 stops or rotates the pickup roller 42, the feed roller 43, and the retard roller 44 as appropriate when driving force is supplied from a medium feed motor (not illustrated). Thus, the pickup roller 42 forwards one or more of the uppermost sheets of media M stored in the media cassette 41. The feed roller 43 and the retard roller 44 further forward only the uppermost one of the forwarded sheets, by stopping the second and lower sheets of the forwarded sheets. Thus, the first medium feeder 40 feeds the medium M in the front direction while separating the sheets of medium M one by one.

The conveyance guide 45 is disposed at the front lower portion in the transfer path W, and causes the medium M to travel along the path W in the front upper direction and then further in the rear upper direction. The conveyance roller pairs 46 and 47 are disposed near the center and near the upper end of the conveyance guide 45, respectively, and are rotated in predetermined directions when the driving force is supplied from the medium feed motor (not illustrated). The conveyance roller pairs 46 and 47 thereby cause the medium M to move along the conveyance path W.

A second medium feeder 50 is also provided on the front side of the conveyance roller pair 47 in the housing 2. The second medium feeder 50 includes a media tray 51 (or a paper tray 51), a pickup roller 52, a feed roller 53, a retard roller 54, and the like. The media tray 51 is formed in a thin plate shape having a thickness in the vertical direction, and media M2 are placed on the upper side of the media tray 51. Note that, the media M2, which may be different in size or quality from the media M stored in the media cassette 41, for example, is placed on the media tray 51.

The pickup roller 52, the feed roller 53, and the retard roller 54 are configured in the same manner as or a similar manner to the pickup roller 42, the feed roller 43, and the retard roller 44 of the first medium feeder 40, respectively. When driving force is supplied from a medium feed motor (not illustrated), the second medium feeder 50 rotates or stops the pickup roller 52, the feed roller 53, and the retard roller 54 as appropriate, to feed in the rear direction the lowermost sheet of the media M2 while stopping the second and lower sheets of the medium M2 on the media tray 51. Thus, the second medium feeder 50 feeds the medium M2 in the rear direction while separating the sheets of the medium M2 one by one. The fed medium M2 is conveyed along the conveyance path W by the conveyance roller pair 57 in the same manner as the medium M. For convenience of explanation, in the following description, the medium M2 is simply referred to as the medium M without being distinguished from the medium M.

The rotations of the pair of the conveyance rollers 47 are controlled appropriately to exert a frictional force on the medium M, to correct a skew of the medium M with respect to the conveyance direction of the medium M, that is, to align the leading and trailing ends of the medium M along the left-right direction, and then feed the medium M in the rear direction. The conveyance roller pair 48 is located on the rear side of the conveyance roller pair 47 with a predetermined distance therefrom, and is rotated in the same manner as the conveyance roller pair 46 and the like, to supply driving force to the medium M being conveyed along the conveyance path W to cause the medium M to travel further to the rear side along the conveyance path W.

The secondary transfer part 39 of the intermediate transfer section 30, which includes the backup roller 33 and the secondary transfer roller 36, is disposed on the rear side of the conveyance roller pair 48. While the predetermined bias voltage is applied to the secondary transfer roller 36 of the secondary transfer part 39, the toner images that are formed by the image formation units 10 and transferred to the intermediate transfer belt 34 are moved toward the secondary transfer part 39 as the intermediate transfer belt 34 runs. Therefore, the secondary transfer part 39 transfers the toner images from the intermediate transfer belt 34 to the medium M being conveyed along the conveyance path W and further conveys the medium M that has the toner images transferred thereon in the rear direction.

A fixation device 60 is located on the rear side of the secondary transfer part 39. The fixation device 60 includes a heating part 61 and a pressurizing part 62 disposed opposite to each other across the conveyance path W. The heating part 61 includes a heating belt formed of an endless belt, a plurality of rollers, a heater that generate heat, and the like inside the heating belt. The pressurizing part 62 is formed as a pressurizing roller in a cylindrical shape in which its center axis is along the left/right direction, and the surface on the upper side is pressed against the surface on the lower side of the heating part 61 to form a nip portion.

Based on the control of the controller 3, the fixation device 60 heat the heater of the heating part 61 to a predetermined temperature and rotates the rollers of the heating part 61 appropriately to cause the heating belt to travel so as to rotate the heating belt in the direction of arrow R1 and rotate the pressurizing part 62 in the direction of arrow R2. The fixation device 60 receives the medium M on which the toner image has been transferred by the secondary transfer part 39, sandwiches (i.e., nips) the medium M between the heating part 61 and the pressurizing part 62, fixes the toner image on the medium M by applying heat and pressure, and then conveys the paper in the rear direction.

A conveyance roller pair 64 is disposed on the rear side of the fixation device 60, and a switching part 65 is disposed on the rear side of the conveyance roller pair 64. The switching part 65 switches the direction of travel of the medium M to the upper side or the lower side according to the control of the controller 3. A medium discharge section 70 is provided on the upper side of the switching part 65. The medium discharge section 70 includes: a conveyance guide 71 which guides the medium M upwardly along the conveyance path W; conveyance roller pairs 72, 73, 74, 75, and the like which face each other across the conveyance path W; and a discharge port 76.

A reconveyance section 66 is provided below the switching part 65, the fixation device 60, and the secondary transfer part 39. The reconveyance section 66 includes a conveyance guide, a conveyance roller pair (not illustrated), and the like which form a reconveyance path Z. The reconveyance path Z extends in the lower direction from the lower side of the switching part 65, extends therefrom in the front direction, and then joins the conveyance route W at the downstream side of the conveyance roller pair 57 in the conveyance path W.

When discharging the medium M, the controller 3 controls the switching part 65 to switch the direction of travel of the medium M to the upper side, that is, to the medium discharge section 70 side. The medium discharge section 70 conveys the medium M received from the switching part 65 upwardly and discharges the medium M from the discharge port 76 to a discharged media tray 2T. Upon re-conveying the medium M with being flipped over, the controller 3 controls the switching part 65 to switch the direction of travel of the medium M to the lower side, that is, to the reconveyance section 66 side. The reconveyance section 66 conveys the medium M received from the switching part 65 along the reconveyance path Z, and eventually causes the medium M to reach the downstream side of the conveyance roller pair 57 in the conveyance path W to be conveyed again along the conveyance path W. Accordingly, the image formation apparatus 1 can return the medium M to the conveyance path W in a state in which the surface of the medium M is reversed on the front and back sides, for performing so-called double-sided printing.

With this configuration, the image formation apparatus 1 can form the toner images using the toner T at the image formation units 10, transfer the toner images to the intermediate transfer belt 34, transfer the toner images from the intermediate transfer belt 34 to the medium M at the secondary transfer part 39, and then fix the toner images on the medium M at the fixation device 60, so as to print (that is, from) an image on the medium M.

For example, in the case in which the image formation apparatus 1 sequentially transfers the lustrous toner image PS of the silver toner TS and the color toner image PL of the normal color toner(s) TL to the intermediate transfer belt 34 by the image formation units 10, these images PS and PL are transferred from the intermediate transfer belt 34 to the medium M at the secondary transfer part 39. With this, the color toner image PL and the lustrous toner image PS are printed on the front surface of the medium M with the color toner image PL and the lustrous toner image PS being superimposed.

Also, the image formation apparatus 1 can transfer and fix the color toner image PL on the front surface of the medium M, return the medium M to the downstream side of the pair of conveyance rollers 57 with the medium M being flipped over by the reconveyance section 66, and transfer and fix the lustrous toner image PS on the back surface of the medium M. With this, the color toner image PL is printed on the front surface of the medium M and the lustrous toner image PS is printed on the back surface of the medium M.

In this case, the image formation apparatus 1 may have the fixing temperatures same as each other (e.g., 150° C.) or different from each other between a first fixing process for fixing the color toner image PL on the front surface of the medium M by the fixation device 60 and a second fixing process for fixing the lustrous toner image PS on the back surface of the medium M.

Further, the image formation apparatus 1 can transfer and fix the lustrous toner image PS to the front surface of the medium M, return the medium M to the downstream side of the pair of conveyance rollers 57 by the reconveyance section 66 without flipping over the medium M, and then transfer and fix the color toner image PL to the same front surface of the medium M. In this case, the lustrous toner image PS and the color toner image PL are printed on the front surface of the medium M with the lustrous toner image PS and the color toner image PL being superimposed.

Incidentally, the image formation apparatus 1 can increase the amount of the toner T adhered on the medium M, by the control of the controller 3 increasing the absolute values of the bias voltages applied, and can decrease the amount of the toner T adhered on the medium M by the control of the controller 3 decreasing the absolute values of the bias voltages applied.

Next, a circuit configuration of the image formation apparatus 1 will be described with reference to a block diagram of FIG. 3. The controller 3 of the image formation apparatus 1 is mainly composed of the print controller 80. The print controller 80 is connected to a storage 81, an interface 82, a display controller 83, a process controller 84, a development voltage controller 85, a supply voltage controller 86, an exposure controller 87, a transfer voltage controller 88, and a motor controller 89.

The print controller 80 includes therein a CPU (Central Processing Unit) 91, ROM (Read Only Memory) 92 and a RAM (Random Access Memory) 93 or the like such that the CPU 91 uses the RAM 93 as a work area and execute various programs read from the ROM 92 and the storage 81 or the like, so as to perform performs various processes.

The storage 81 (or the storage unit) is, for example, a non-volatile storage medium such as a hard disk drive (HDD), a solid state drive (SSD), or the like and is configured to store therein various programs and various information. In the storage 81, a normal color data conversion table 95 and a lustrous color data conversion table 96 are provided. Of these, the normal color data conversion table 95 stores information for forming a printing pattern corresponding to a portion represented by each of the normal colors (black, cyan, magenta, and yellow) of the printing data obtained from the external apparatus 100. The lustrous color data conversion table 96 stores information for forming a printing pattern corresponding to a portion represented by the lustrous color (e.g., silver) of the printing data obtained from the external apparatus 100.

The interface 82 functions as an interface for a wired LAN (Local Area Network) conforming to the standards such as IEEE (Institute of Electrical and Electronics Engineers) 802.3 u/ab/an/ae, a wireless LAN conforming to the standards such as IEEE 802.11 a/b/g/n/ac/ax, or the like, for example. The interface 82 is configured to transmit and receive various information between the image formation apparatus and another device such as the external apparatus 100, a server device (not illustrated), or the like.

The display controller 83 is configured, based on an instruction from the print controller 80, to generate display screen data representing various display screens in which characters and figures, etc. are appropriately arranged, and to transmit the display screen data to the display 4 so as to display the display screen thereof on the display 4.

The process controller 84 is configured to control the voltage or the like of each part in each image formation unit 10 based on an instruction from the print controller 80. The development voltage controller 85 is configured to control a development voltage applied to the development roller 24 and the development blade 25 (FIG. 2) based on an instruction from the printing controller 80. The supply voltage controller 86 is configured to control a supply voltage applied to the first supply roller 22 and the second supply roller 23 (FIG. 2) based on an instruction from the print controller 80.

The exposure controller 87 is configured to control to turn on and off each light emitting element chip provided in the LED head 14, based on an instruction from the print controller 80. The transfer voltage controller 88 is configured to control the transfer voltage applied to the primary transfer roller 35, the secondary transfer roller 36 (FIG. 2), and the like, based on an instruction from the print controller 80. The motor controller 89 is configured to control rotations of the photosensitive drum 26 (FIG. 2), the rollers, and the like, based on an instruction from the print controller 80.

The external apparatus 100 may be, for example, an information processing apparatus such as a personal computer and execute, based on operation of the user, various application programs such as document creation, spreadsheets, image editing, or the like. The external apparatus 100 has a printer driver installed therein in advance for printing documents and images in the image formation apparatus 1. When receiving a printing instruction such as document data and image data from a user through an application program, the external apparatus 100 executes the printer driver to generate printing data based on the printing instruction such as the document data and the image data, and transmits the printing data to the image formation apparatus 1.

1-2. Configuration of Toner

Next, the toner (may be referred to as a developer) contained in the toner container 12 of the image formation unit 10 (FIG. 2) will be described. For normal colors (black, cyan, magenta and yellow), the toner of normal colors (black, cyan, magenta and yellow) that are commercially available for C941dn manufactured by Oki Electric Industry Co., Ltd. are used.

For the toner of the special color(S) which is the lustrous color, silver color toner (hereinafter may be referred to as silver toner) is manufactured and used. The silver toner is manufactured by the following method.

In an embodiment, for manufacturing the silver toner, an aqueous medium in which an inorganic dispersant is dispersed is first generated. Specifically, 600 parts by weight of industrial trisodium phosphate dodecahydrate are mixed with 18400 parts by weight of pure water and dissolved at a liquid temperature of 60° C., and then dilute nitric acid for pH (hydrogen ion index) adjustment is added, to thus obtain the aqueous solution. To this aqueous solution, a calcium chloride solution, in which 300 parts by weight of industrial calcium chloride anhydride are dissolved in 2600 parts by weight of pure water, is added, and then the solution is stirred at high speed by a line mill (from Primix Corporation) at a rotation speed of 3,566 [rpm] for 50 minutes while maintaining the liquid temperature at 60 [° C.]. In this way, the aqueous phase is adjusted, which is the aqueous medium in which the suspension stabilizer (inorganic dispersant) is dispersed.

In an embodiment, a material dispersion oily medium is generated. Specifically, 470 parts by weight of a lustrous pigment including aluminum particles (the pigment volume median diameter of 5.4 μm) and 23 parts by weight of a charge controller (BONTRON E-84: manufactured by Orient Chemical Industry Co.) are mixed in 7000 parts by weight of ethyl acetate serving as an organic solvent, to produce a pigment dispersion solution.

In an embodiment, the lustrous pigment whose volume average particle size (also referred to as volume medium diameter) is 5.4 μm is used. However, the disclosure is not limited thereto. Specifically, the volume average particle size of the lustrous pigment may be preferable in a range of 5 μm or more and 20 μm or less, and more preferable in a range of 5.3 μm or more and 5.7 μm or less.

Thereafter, in an embodiment, 175 parts by weight of ester wax (WE-4 made by NOF Corporation) and 1670 parts by weight of polyester resin are added to the pigment dispersion liquid while the pigment dispersion liquid is being stirred with being maintained at a liquid temperature of 60° C., and the resulting mixture is stirred until a solid material disappears. In this way, an oil phase, which is a pigment dispersion oily medium, is prepared.

Then, in an embodiment, the oil phase is put into the aqueous phase whose liquid temperature has been lowered to 55° C., and the resulting mixture is stirred at a rotation speed of 1000 rpm for 5 minutes so as to be suspended, with the result that particles are formed in the suspension. Next, the suspension is distilled under reduced pressure to remove the ethyl acetate and form a slurry containing the toner. Further, nitric acid is added to the slurry to reduce the pH to 1.6 or less, and the slurry is stirred to dissolve tricalcium phosphate as a suspension stabilizer, and then dehydrated to form the toner. Then, the dehydrated toner is dispersed and stirred in pure water, to wash the toner. Thereafter, in an embodiment, a dehydration process, a drying process and a classification process are carried out to produce toner base particles.

In an embodiment, as an external additive addition process, 1.5 [weight %] of small silica (RY200: manufactured by NIPPON AEROSIL Co., Ltd.), 2.29 [weight %] of colloidal silica (X24-9163A: manufactured by Shin-Etsu Chemical Co., Ltd.), and 0.37 [weight %] of melamine particles (EPOSTAR S: manufactured NIPPON SHOKUBAI Co., Ltd.) are added to the produced toner base particles and mixed. Thus, in an embodiment, the silver toner having luster is obtained. The volume median diameter of the prepare silver toner is measured to be 15.01 μm. Note that the volume medium diameter of the silver toner is not limited to 15.01 μm, for example, may be in a range from 10 to 20 μm.

1-3. Visual Effects of Medium

Next, a medium M in which an image is printed by the image formation apparatus 1 will be described. The image formation apparatus 1 can print a color toner image PL using a normal color toner TL, on the front surface of the medium M and a lustrous toner image PS using a silver toner TS having luster on the back surface of the medium M, such as being illustrated in FIGS. 4A and 4B, for example. The medium that is hereinafter referred to as a decorative medium MC is the medium M having the color toner image PL (also referred to as a first image) printed on one of the surfaces (also referred to as one surface, or a first surface) of the medium M and the lustrous toner image PS (also referred to as a second image) printed on the other of the surfaces (also referred to as the other surface, an opposite surface, or a second surface) of the medium M.

When printing the lustrous toner image PS on the other surface of the medium M for obtaining the decorative medium MC, the image formation apparatus 1 forms, under control of the controller 3, plural regions including a background region AB and a decorative region AC on the other surface, as illustrated in a schematic enlarged view in FIG. 4C. In this lustrous toner image PS, the adhesion amount of the silver toner TS per unit area is different between the background region AB and the decorative region AC. For convenience of explanation, hereinafter, the background region AB may be referred to as a first region, and the decorative region AC may be referred to as a second region.

The amount of the toner (the color toner TL or the silver toner TS) adhered to the medium M per unit area can be expressed by an image density N %. The image density N corresponds to a ratio of an area of a printed portion (a portion where an image is formed) to an entire area of a printable area in a predetermined area (e.g., an area corresponding to one rotation of the photosensitive drum 26 or an area corresponding to one sheet of media M). When printing an image with the area ratio of 100%, that is, when performing so-called solid printing in the entire area, the image density N is 100%. That is, when printing an image in an area corresponding to 1% of the printable area in the medium M, the image density N is 1%.

Incidentally, the image having the image density N of less than 100% can be realized, for example, by thinning, from the image having the image density N of 100%, toner in thin lines extending along a direction perpendicular to a predetermined direction at a predetermined interval in the predetermined direction. In this case, it is possible to adjust the image density N, for example, by adjusting a length of the interval and/or adjusting a width of each of the thin lines (number of dots).

Alternatively, the image having the image density N of less than 100% can be realized, for example, by thinning, from the image having the image density N of 100%, toner in a halftone dot manner. In this case, it is possible to adjust the image density N, for example, by adjusting the number of the dots per unit area and/or adjusting the size of each of the dots.

Here, Cm is the number of dots actually used in the printing process, i.e., the number of dots of the exposure light while the photosensitive drum 26 rotates Cd times. Further, C0 (maximum dot number) is the maximum number of dots per rotation of the photosensitive drum 26, i.e. the number of dots that can maximally be printed (the number of dots for printing the solid image) during one rotation of the photosensitive drum 26.

Thus, the maximum number of dots that can maximumly be printed during Cd rotations of the photosensitive drum 26 is (Cd×C0). Therefore, the image density N can be expressed by the following equation (1).

$$N=(Cm/Cd\times C0))/100\% \quad (1)$$

The amount of the toner (the color toner TL or the silver toner TS) adhered to the medium M per unit area can be also expressed by a print duty D, as well as the image density N % described above. The print duty D is a ratio of an area in which toner is used in the print image (that is, an area in which the toner is adhered to the medium) based on the printing data, relative to the printable area where a solid image can be printed, assuming the print duty D is 100% when printing the solid image in the printable area. Thus, hereinafter, the print duty D may be referred to as an adhesion ratio or a toner adhesion ratio. Note that the solid image is an image formed on the medium M using the toner by emitting exposure light on the entire area of the printable area in the photosensitive drum 26. That is, the solid image is an image in which the toner is used in all the available dots.

In other words, the print duty D is the ratio of the number of dots used in the actual toner image based on the printing data relative to the total number (the maximum number) of dots constituting the printable area in the medium M. The print duty D may be referred to as a printing ratio.

For example, when printing an image on the medium M based on the printing data, the controller 3 calculates the print duty D by the following equation (2), assuming the dot count of the image data based on the printing data is C1 and the dot count for the solid image (full exposure) on the medium M is C0. Incidentally, the following equation (2) is only an example, and the controller 3 may calculate the print duty D by another calculation equation.

$$D=(C1/C0)\times 100\% \quad (2)$$

In an embodiment, the print duty D of the background region AB (hereinafter may be referred to as a background print duty DB) and the print duty D of the decorative region AC (hereinafter may be referred to as decorative print duty DC) are different in the lustrous toner image PS. As an example, the background print duty DB is 100% and the decorative print duty DC is 75% in the lustrous toner image PS of the decorative medium MC. For convenience of explanation, hereinafter, the background print duty DB is also referred to as a first adhesion ratio, and the decorative print duty DC is also referred to as a second adhesion ratio.

Figure 5A:
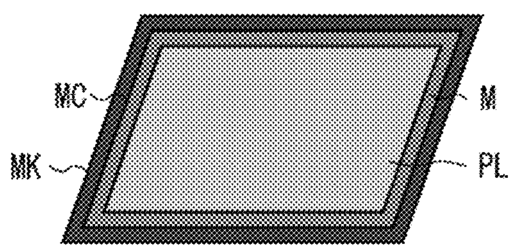
FIGS. 5A and 5B are schematic diagrams illustrating how a visual effect appears.

As illustrated in FIG. 5A, when the user sees the decorative medium MC for which the black paper MK is superimposed on the back surface side of the decorative medium MC, at a predetermined angle from the front surface side of the medium MC, the decorative medium MC makes the color toner image PL on the front surface visible but does not make the decorative region AC and the background region AB on the back surface visible.

Figure 5B:
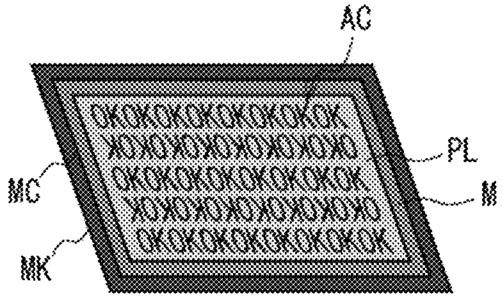

To the contrary, as illustrated in FIG. 5B, when the user sees the decorative medium MC for which the black paper MK is superposed on the back surface side of the decorative medium MC, at an angle (or an attitude) different from that of FIG. 5A from the front surface side of the medium MC, the appearance of the decorative region AC and the background region AB of the back surface becomes different from each other with being overlapped with the color toner image PL on the front surface. That is, the decoration medium MC allows the user to visually recognize an image in which the decorative region AC appears to stand out against the background region AB.

In this way, depending on the angles of the user's viewpoint, the light source, and/or the like, the decoration medium MC can transition between a state in which the decoration area AC is appearing (hidden) (FIG. 5A) and a state in which the decoration area AC is disappearing (visible) (FIG. 5B). In other words, the decorative medium MC provides a visual effect to the user, in which the decorative region AC is appearing and disappearing by changing the position, the posture, or the like of the decorative medium MC.

For example, as a visual effect to the user, the decorative medium MC may first visualize only the color toner image PL on the front surface, and then, when the posture of the decorative medium MC is changed, give the impression that the decorative region AC emerges with overlapping with the color toner image PL.

Next, a principle in which such a visual effect occurs in the decorative medium MC will be described. When the user sees the front surface of the decorative medium MC under a bright condition, the color toner image PL on the front surface of the decorative medium MC reflect light and thus the decorative medium MC allows the user to visually recognize the color toner image PL well.

When the user sees the back surface of the decorative medium MC under a bright condition, the lustrous pigment (aluminum piece, etc.) included in the lustrous toner image PS on the back surface of the decorative medium MC reflects light and thus the decorative medium MC allows the user to visually recognize the lustrous toner image PS well. The lustrous toner image PS differs the print duty D in the background region AB and the decorative region AC therein as described above. Accordingly, the reflection degree of light is deferent between the background region AB and the decorative region AC, and thus the decorative medium MC allows the user to visually recognize the decorative region AC, the boundary between the decorative region AC and the background region AB, and the like well.

Figure 6A:
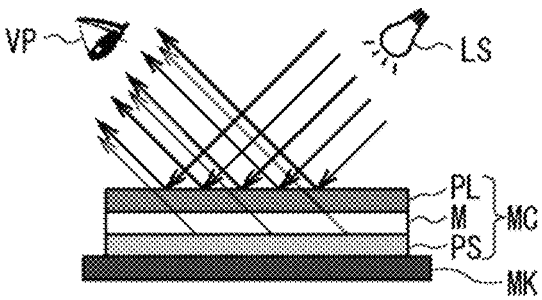
FIGS. 6A and 6B are schematic diagrams illustrating a principle in which the visual effect appears.

Next, as illustrated in FIG. 6A, it is assumed that both the light source LS and the user viewpoint VP is located on the front surface side of the decorative medium MC in a state in which the black paper MK is superimposed on the back surface side of the decorative medium MC. In this case, since the light is blocked by the black paper MK on the back surface of the decorative medium MC, the light does not pass from the back surface side of the decorative medium MC to the front surface side of the decorative medium MC.

At this time, the decorative medium MC can effectively reflect the light emitted from the light source LS by the color toner image PL on the front surface thereof, so as to deliver the light having sufficient intensity to the user's eyes from the color toner image PL. The decorative medium MC also allows a portion of the light emitted from the light source LS to pass through the color toner image PL and the transparent medium M to reach the lustrous toner image PS on the back surface side of the medium MC. Further, the decorative medium MC reflects the light from the light source by the lustrous toner image PS with a relatively high reflectance, a portion of the reflected light passes through the transparent medium M and the color toner image PL to the user's viewpoint VP.

Focusing now on the intensity of the light reaching the user's viewpoint VP, the intensity of the light reflected by the color toner image PL is sufficiently greater than the intensity of the light reflected by the lustrous toner image PS. Therefore, when the user sees the front surface of the decorative medium MC, as illustrated in FIG. 5A, the user can visually recognize the color toner image PL in a good manner while hardly visually recognize the lustrous toner image PS. In other words, the decorative medium MC can hide the image represented by the decorative region AC of the lustrous toner image PS to the user in the state illustrated in FIG. 6A.

Figure 6B:
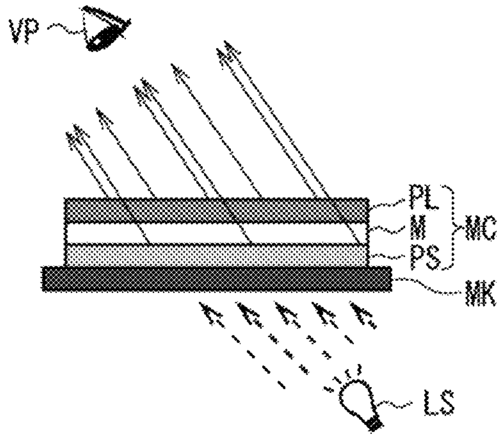

Next, as illustrated in FIG. 6B, it is assumed that the user viewpoint VP is located on the front surface side of the decorative medium MC and the light source LS is located on the back surface side of the decorative medium MC in the state in which the black paper MK is superimposed on the back surface side of the decorative medium MC. In this case, the light is blocked by the black paper MK on the back surface of the decorative medium MC, and the light does not pass from the back surface side of the decorative medium MC to the frond side of the decorative medium MC.

At this time, the decorative medium MC cannot sufficiently reflect the light emitted from the light source LS by the color toner image PL on the front surface of the decorative medium MC due to the positional relationship with the light source LS, so that relatively weak light from the color toner image PL is delivered to the user's eyes. To the contrary, the decorative medium MC allows a portion of the light emitted from the light source LS to pass through the color toner image PL and the transparent medium M so that the passed light reaches the lustrous toner image PS on the back surface side of the decorative medium MC. The decorative medium MC reflects the light by the lustrous toner image PS with a relatively high reflectance, and a portion of the reflected light passes through the transparent medium M and the color toner image PL to reach the user's viewpoint VP.

Focusing now on the intensity of the light reaching the user's viewpoint VP, the intensity of the light reflected by the color toner image PL is not so high as compared to the intensity of the light reflected by the lustrous toner image PS. Accordingly, when the user sees the front surface side of the decorative medium MC as illustrated in FIG. 5B, the color toner image PL can be visually recognized to some extent and the lustrous toner image PS can also be visually recognized. In other words, the decorative medium MC can show the image represented by the decorative region AC of the lustrous toner image PS to the user in the state illustrated in FIG. 6B.

1-4. Conditions for Obtaining Visual Effect

Next, in order to investigate conditions for obtaining a good visual effect from the decorative medium MC produced by the image formation apparatus 1 performing a decorative printing on the medium M, an evaluation test is conducted on each of plural types of the decorative media MC prepared in which the print duty of the silver toner TS in the lustrous toner image PS are different from each other.

1-4-1. Preparation of Media for Evaluation

In this evaluation test, CG3700 (3M Japan K.K.), an OHP film, is used as the medium M. In this evaluation test, as a color toner image PL, a solid image of the cyan toner (C), that is, an image of the cyan toner (C) with the print duty of 100%, is used. Hereinafter, this color toner image PL of the cyan toner may be referred to as a cyan image.

In this evaluation test, an optical density O.D. of the medium M having the cyan image printed on the front surface thereof is measured using a spectrophotometer (X-Rite exact: by XLIGHT Co., Ltd.). In this evaluation test, the bias voltages (e.g., development voltage, and etc.) in the cyan (C) image formation unit 10C in the image formation apparatus 1 are adjusted by the control of the controller 3 to obtain the optical density O.D of 1.4 and the toner adhesion amount on the medium (the amount of the toner adhered on the medium) of 0.45 mg/cm$^2$.

Next, in this evaluation test, the lustrous toner image PS of the silver toner TS is printed on the back surface of the medium M. Specifically, the image formation apparatus 1 transfers and fixes the color toner image PL (cyan image) onto the front surface of the medium M, flips over the medium M at the reconveyance section 66 (FIG. 1), and then transfers and fixes the lustrous toner image PS onto the back surface of the medium M.

In this evaluation test, the print duty D of the background region AB (i.e., background print duty DB) is set to 100%, and the print duty D of the decorative region AC (i.e., decorative print duty DC) is set to a value less than 100%.

In this evaluation test, the adjustment of the silver toner TS by the image formation apparatus 1 is carried out using a luminous reflectance difference (a visual reflectance difference) ΔY. This luminous reflectance difference ΔY is calculated by subtracting a luminous reflectance Y2 on the medium M before printing from a luminous reflectance Y1 on the image after printing. The spectrophotometer CM-2600d (manufactured by Konica Minolta Japan Co., Ltd.) is used for the measurement of the luminous reflectance difference ΔY. As the measurement condition for the luminous reflectance difference ΔY, the light source is an auxiliary illuminant C (6774 K) for the colorimetry, and the SCE (specular reflection light removal) is used for the specular reflection light.

In the evaluation test, the various bias voltages (development voltages, etc.) in the silver(S) image formation unit 10S are appropriately adjusted to produce the evaluation media PE1 to PE8 in each of which the luminous reflectance difference ΔY in the background region AB of the lustrous toner image PS printed on the back surface of the medium M by the image formation apparatus 1 is a value of 36. By this adjustment by the image formation apparatus 1, the toner adhesion amount on the medium of the lustrous toner image PS when the print duty D of the background region AB is 100% is 0.65 mg/cm$^2$.

Then, in this evaluation test, as the lustrous toner image PS, eight different evaluation images PE (PE1, PE2, . . . , PE8) are formed and printed on the back surfaces of the media M respectively with decorative print duty DC (i.e., print duty D of the decorative region AC) varied from 93.75% at 6.25% intervals. Hereinafter, the medium M having the color toner image PL printed on the front surface thereof and the evaluation image PE printed on the back surface thereof is referred to as an evaluation medium ME.

Specifically, as illustrated in Table TBL1 in FIG. 7A, the eight evaluation images PE are formed respectively with the decorative print duty DC of 93.75%, 87.50%, 81.25%, 75.00%, 68.75%, 62.50%, 56.25%, and 50.00%. With this, the evaluation images PE are obtained in which the amount of toner on the medium in the decorative region AC are 0.61, 0.57, 0.53, 0.49, 0.45, 0.41, 0.37, and 0.33 mg/cm$^2$, respectively. Incidentally, in each evaluation image PE, plural sets of letters "OK" are formed as the decorative region AC (FIG. 4C and FIG. 5B).

For each evaluation image PE, a duty difference, which is a difference value between the background print duty DB and the decorative print duty DC, is calculated, and the calculation results are also listed in Table TBL1 in FIG. 7A. The duty difference represents the difference in the amount of the silver toner TS adhered to the medium per unit area. The evaluation images PE1 to PE8 have the duty differences varied at the 6.25% intervals as described above.

In each evaluation image PE, since the background print duty DB is the constant value of 100%, the value of the decorative print duty DC indicates the ratio of the decorative print duty DC to the background print duty DB, and indicates the ratio of the toner adhesion amount in the decorative region AC to the toner adhesion amount in the background region AB. For example, in the evaluation image PE1, the value of the decorative print duty DC is 93.75% and thus the ratio of the decorative print duty DC to the background print duty DB is 93.75%. In the evaluation image PE3, the value of the decorative print duty DC is 81.25% and thus the ratio of the toner adhesion amount in the decorative region AC to the toner adhesion amount in the background region AB is 0.82, when rounded off to the third decimal place.

1-4-2. Measurement of Reflectance

Figure 8:
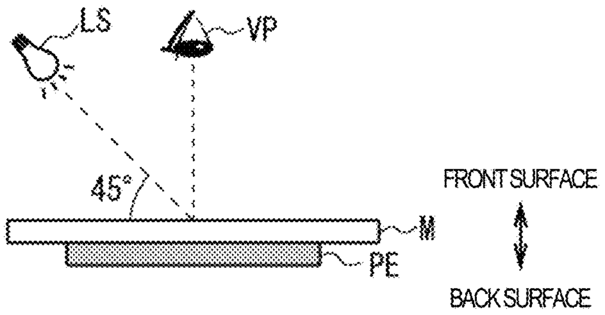
FIG. 8 is a schematic diagram illustrating a method of measuring a reflectance.

Next, as illustrated in the schematic diagram in FIG. 8, a measurement medium MM to be measured is produced which has only the evaluation image PE printed on the back surface of the medium M without printing the color toner image PL on the front surface of the medium M, and then the reflectance on the measurement medium MM is measured. Hereinafter, this measurement is called as a reflectance measurement.

In the reflectance measurement, as illustrated in FIG. 8, the light source LS is arranged in such a manner that the incident angle of the light from the light source to the front surface of the measurement medium MM is 45 degrees and the viewpoint VP of the user (person performing the determination) is positioned at the angle of 90 degrees relative to the front surface of the measurement medium MM. That is, the viewpoint VP is positioned with respect to the measurement medium MM such that the line of sight LVP from the viewpoint VP is perpendicular to the front surface of the measurement medium MM, that is, the angle of the line of sight LVP relative to the normal of the surface of the measurement medium MM is 0 degrees. Hereinafter, the reflectance obtained by this reflectance measurement is also referred to as a zero-degrees reflectance (0° reflectance) or a Y value.

In this reflectance measurement, a deflection photometer GC500L (manufactured by Nippon Denko Kogyo Co., Ltd.) is used, to measure reflectance of light from each of the decorative region AC and the background region AB of each of the measurement media MM to which the evaluation images PE1 to PE8 are respectively printed, and the measurement results are obtained as illustrated in Table TBL2 in FIG. 7B. The table TBL2 also illustrates a difference in the zero-degrees reflectance between the decorative region AC and background region AB for each of the evaluation images PE1 to PE8.

Comparing the values in Tables TBL1 and TBL2, it can be seen that the value of the zero-degrees reflectance (Y value) in the decorative region AC also increases or decreases with increase or decrease of the decorative print duty DC, which is the print duty D in the decorative region AC. That is, it can be seen that there is a correlation between the print duty D and the zero-degrees reflectance (Y value).

1-4-3. Measurement of Luminous Reflectance Difference

Next, in this evaluation test, a measurement media MM on which the evaluation images PE1 to PE8 are respectively printed are used, and a luminous reflectance difference ΔY is measured in accordance with the same conditions as described above for the adjustment of the silver toner TS in the image formation apparatus 1.

Specifically, the luminous reflectance difference ΔY in each of the decorative region AC and the background region AB is measured on each of the measurement media MM to which the evaluation images PE1 to PE8 are respectively printed. With this, the measurement results are obtained as illustrated in Table TBL2 (FIG. 7B). Table TBL2 also illustrates, for each evaluation image PE, a difference in the value of the luminous reflectance difference ΔY between the background region AB and the decorated region AC, and a rate of decrease (a decrease rate) in the luminous reflectance difference ΔY from the background region AB to the decorated region AC.

Comparing the values in Tables TBL1 and TBL2, it can be seen that the value of the luminous reflectance difference ΔY in the decorative region AC increases or decreases along with increase or decrease of the decorative print duty DC, which is the print duty D in the decorative region AC. That is, it can be seen that there is a correlation between the print duty D and the luminous reflectance difference ΔY.

1-4-4. Visual Judgment on Image

Next, a medium M having the color toner image PL printed on the front surface and each evaluation image PE printed instead of the lustrous toner image PS on the back surface of the medium M (hereinafter referred to as an evaluation medium ME) is used to perform visual judgment. This visual judgment is performed by determining whether or not it is possible to distinguish between the background region AB and the decorative region AC, i.e. whether it is possible to recognize the letters "OK" as the decorative region AB, in each of two visual judgment conditions in which the angle of the line of sight with respect to the image under a fixed light source are different from each other. Hereinafter, this determination is referred to as a visual judgment.

Figure 9A:
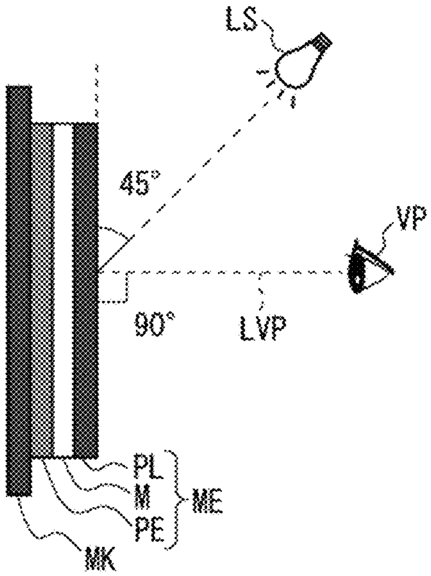
FIGS. 9A and 9B are schematic diagrams illustrating a method of measuring a luminous reflectance difference.
Figure 9B:
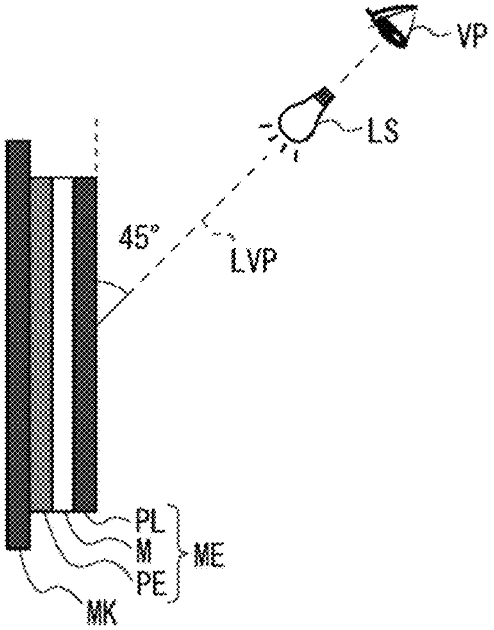

These two visual judgment conditions are: a first visual judgement condition illustrated in a schematic diagram of FIG. 9A; and a second visual judgment condition illustrated in a schematic diagram of FIG. 9B. In the first visual judgment condition, the light source LS is positioned so that the incident angle is 45 degrees with respect to the surface of the evaluation medium ME, the viewpoint VP of the user (person performing the judgment) is positioned in a direction to form a 90 degrees with respect to the surface, i.e. the line of sight LVP from the user's viewpoint VP is positioned perpendicular to the surface of the medium ME.

In the second visual judgment condition, the light source LS is positioned so that the incident angle is 45 degrees with respect to the surface of the evaluation medium ME as in the first visual judgment condition, the viewpoint VP of the user is positioned on the same straight line as the incident direction from the light source LS, i.e. the line of sight LVP from the viewpoint VP is positioned at 45 degrees with respect to the surface of the evaluation medium ME.

In each of the visual judgment conditions, a fluorescent lamp is used as the light source LS and a distance from the light source LS to the evaluation medium ME is set to 200 mm, so that luminous at the surface of the evaluation medium ME is about 800 (Ix). This visual judgment is carried out in a dark room, so as to eliminate effects of other lighting or the like.

In this visual judgment, a black paper MK having a sufficient thickness is superimposed on the back surface side of the evaluation medium ME. This prevents objects or the like behind the evaluation medium ME from being seen through even though the medium M has a high transparency for visible light.

By performing such two kinds of visual judgments, the judgment results are obtained as illustrated in Table TBL3 in FIG. 7C. Specifically, in the first visual judgment condition, the background region AB and the decoration region AC cannot be distinguished from each other in each of the evaluation media ME1 to ME6, but can be distinguished from each other in each of the evaluation media ME7 and ME8. To the contrary, in the second visual judgment condition, the background region AB and the decorative region AC cannot be distinguished from each other in each of the evaluation media ME1 and ME2, but can be distinguished from each other in each of the evaluation media ME3 to ME8. In Table TBL3, the symbol "o" represents that the background region AB and the decorative region AC can be distinguished from each other, and the symbol "x" represents that the background region AB and the decorative region AC cannot be distinguished from each other.

Next, the relationship between the judgment results of the two types of visual judgments and the visual effect in which the decorative region AC is appearing and disappearing according to the angle of the medium M is summarized.

In each of the evaluation media ME1 and ME2, the background region AB and the decorative region AC cannot be distinguished from each other, under each of the first visual judgment condition and the second visual judgment condition. In other words, the decorative region AC on each of the evaluation media ME1 and ME2 is hidden (cannot be seen) regardless of the angle of the medium M. That is, each of the evaluation media ME1 and ME2 does not provide the visual effect in which the decorative region AC is appearing and disappearing.

In each of the evaluation media ME7 and ME8, the background region AB and the decorative region AC can be distinguished from each other, under each of the first visual judgment condition and the second visual judgment condition. In other words, the background region AB and the decorative region AC are kept visible regardless of the angle of the medium M. That is, each of the evaluation media ME7 and ME8 does not provide the visual effect in which the decorative region AC is appearing and disappearing.

To the contrary, in each of the evaluation media ME3 to ME6, the background region AB and the decorative region AC cannot be distinguished from each other in the first visual judgment condition, but can be distinguished from each other in the second visual judgment condition. In other words, in each of the evaluation media ME3 to ME6, the appearance of the decorative region AC transitions between the state in which the decorative region AC is appearing (visible) and the state in which the decorative region AC is disappearing (hidden) according to the angle of the medium. That is, each of the evaluation media ME3 to ME6 provides the visual effect in which the decorative region AC is appearing and disappearing.

Furthermore, in each of the evaluation media ME4 and ME5, the difference in the appearance between the background region AB and the decoration region AC in the second visual judgment condition is greater than those in the evaluation media ME3 and ME6. Thus, the decoration region AC can be more clearly visible in each of the evaluation media ME4 and ME5. That is, each of the evaluation media ME4 and ME5 provides the visual effect in which the decorative region AC is appearing and disappearing remarkably.

Accordingly, the overall evaluation of the visual effect is obtained as illustrated in Table TBL3 (FIG. 7C), in which the symbol "⊚" is used to indicate the excellent visual effect is obtained, and the symbol "○" is used to indicate the visual effect is obtained, and the symbol "x" is used to indicate the visual effect is not obtained.

Here, the conditions for obtaining the visual effect are summarized based on Tables TBL1, TBL2, and TBL3 (FIG. 7). When the background print duty DB is set to 100%, the decorative print duty DC for obtaining the visual effect is in the range of 62.50% or more and 81.25% or less, the duty difference between the background print duty DB and the decorative print duty DC for obtaining the visual effect is in the range of 18.75% or more and not more than 37.50%. Furthermore, the ratio of the decorative print duty DC to the background print duty DB for obtaining the visual effect is in the range of 62.50% or more and 81.25% or less, which is equal to the value of the decorative print duty DC.

The difference in the zero-degree reflectance between the background region AB and the decorated region AC for obtaining the visual effect is in the range of 1.53% or more and 5.79% or less. Furthermore, the difference in the luminous reflectance difference ΔY between the background region AB and the decorative region AC for obtaining the visual effect is in the range of 8 or more and 14 or less, and the decrease rate in the luminous reflectance difference ΔY of the decorative region AC from the background region AB for obtaining the visual effect is within the rage of 22% or more and 39% or less.

These numerical values are quantitatively represented by the results of the visual judgment described above in different representation techniques. For example, it indicates that the visual effect can be obtained when the difference in the zero-degree reflectance between the background region AB and the decorated region AC is in the range of 1.53% or more and 5.79% or less.

1-5. Decorative Medium Printing Process

Next, a decorative medium printing process of producing a decorative medium MC by the image formation apparatus 1 printing on the medium M an image that produces a visual effect will be described. Upon receiving printing data from the external apparatus 100 through the interface 82, the controller 3 (FIG. 3) of the image formation apparatus 1 reads a decorative medium printing program from the storage 81 and executes the decorative medium printing program by the print controller 80, and starts a decorative medium printing processing procedure RT1 illustrated in FIG. 10, to move on to the first step SP1.

In step SP1, the controller 3 feeds one sheet of media M from the media cassette 41 by the first medium feeder 40 and transfers the fed medium M along the conveyance path W, and then moves to the next step SP2. Thus, the medium M is conveyed to the secondary transfer part 39 with a front surface of the medium M facing the upper side (the side facing the intermediate transfer belt 34).

In step SP2, the controller 3 controls, based on the received printing data, the normal color image formation units 10 (10K, 10C, 10M, and 10Y) to form a color toner image PL, which is to be printed on the front surface of the medium M, on the intermediate transfer belt 34 (FIGS. 1 and 2), and moves to the next step SP3.

In step SP3, the controller 3 transfers the color toner image PL from the intermediate transfer belt 34 to the front surface of the medium M by the secondary transfer part 39, and moves to the next step SP4. In step SP4, the controller 3 fixes the color toner image PL to the front surface of the medium M by the fixation device 60 and moves to the next step SP5.

In step SP5, the controller 3 returns the medium M to the conveyance path W with the medium M flipped over by the reconveyance section 66, and conveys the returned medium M along the conveyance path W, and then moves to the next step SP6. With this, the medium M is conveyed to the secondary transfer part 39 with a back surface of the medium M facing the upper side (the side facing the intermediate transfer belt 34).

In step SP6, the controller 3 controls the silver color image formation unit 10S based on the received printing data, and forms a lustrous toner image PS, which is to be printed on the back surface of the medium M, on the intermediate transfer belt 34, and then moves to the next step SP7. At this time, based on the received printing data, the controller 3 forms the lustrous toner image PS (FIG. 4) that includes the background region AB and the decorative region AC, such that the background print duty DB of the background region AB is 100% and the decorative print duty DC of the decorative region AC is in the range of 62.50% or more and 81.25% or less.

In step SP7, the controller 3 transfers the lustrous toner image PS from the intermediate transfer belt 34 to the back surface of the medium M by the secondary transfer part 39, and moves to the next step SP8. In step SP8, the controller 3 fixes the lustrous toner image PS on the back surface of the medium M by the fixation device 60, and moves to the next step SP9. At this time, the heat and pressure from the fixation device 60 is applied to not only the lustrous toner image PS on the back surface of the medium M but also the color toner image PL on the front surface of the medium M, and thus the surface of the color toner image PL on the front surface of the medium M is smoothed more.

In step SP9, the controller 3 conveys the medium M along the conveyance path W by the medium discharge section 70 to discharge the medium M through the discharge port 76 to the discharged media tray 2T, and moves to the next step SP10 to terminate the decorative medium printing processing procedure RT1. As a result, the image formation apparatus 1 prints the color toner image PL on the front surface of the medium M and the lustrous toner image PS on the back surface of the medium M, that is, the image formation apparatus 1 produces the decorative medium MC.

1-6. Effects and the Like

According to the configuration described above, the image formation apparatus 1 according to a first embodiment prints the color toner image PL on the front surface of the medium M and prints the lustrous toner image PS including the background region AB and the decorative region AC on the back surface of the medium M, so as to obtain the decorative medium MC.

When the image formation apparatus 1 forms the lustrous toner image PS by the silver image formation unit 10S, the image formation apparatus 1 controls the background print duty DB of the background region AB to be 100%, and the decorative print duty DC of the decorative region AC to be in the range of 62.50% or more and 81.25% or less. From another viewpoint, the image formation apparatus 1 controls the duty difference between the background print duty DB and the decorative print duty DC to be 18.75% or more and 37.50% or less, and the ratio of the decorative print duty DC to the background print duty DB to be in the range of 62.50% or more and 81.25% or less.

In other words, the image formation apparatus 1 controls the difference in the toner amount per unit area on the medium (the toner adhesion amount) between the background region AB and the decorative region AC to be 0.12 $mg/cm^2$ or more 0.24 $mg/cm^2$ or less. In addition, the image formation apparatus 1 controls the ratio of the toner adhesion amount in the decorative region AC to the toner adhesion amount in the background region AB to be in a range of 0.63 or more to 0.82 or less, when rounded off to the third decimal place.

Thus, the image formation apparatus 1 can provide a good visual effect such that the decorative region AC is appearing (seen) and disappearing (hidden) from the front surface side of the decorative medium MC, when the positions and angles of the user's viewpoint VP, the light source LS, and the decorative medium MC change in various ways, such as when the position and posture of the decorative medium MC are changed in various way by the user.

Incidentally, as described above, in the lustrous toner image PS, a certain difference in the print duty D (background print duty DB and decorative print duty DC) is provided between the background region AB and the decorative region AC. Therefore, when the lustrous toner image PS is printed on the medium M, there is a possibility that a step is formed on the surface of the lustrous toner image along the boundary portion between the background region AB and the decorative region AC of the lustrous toner image.

Therefore, in a case where the color toner image PL is printed on the lustrous toner image PS on the front surface of the medium M, that is, in a case of Patent Document 1, there is a possibility that the surface of the color toner image PL also has a step, caused by the step formed on the surface of the lustrous toner image PS along the boundary portion between the background region AB and the decorative region AC.

In such a case, the user looks the medium M in the same situation as in FIG. 6A, the step formed on the surface of the color toner image PL may be visually recognized, and the shape of the decorative region AC may be perceived. That is, even if it is desired to hide the decorative region AC with the color toner image PL, there is a possibility that the decorative region AC is visually recognized based on the shape of the step.

In light of this, the image formation apparatus 1 according to a first embodiment is configured to print the color toner image PL on the front surface side of the medium M and the lustrous toner image PS on the back surface side of the medium M so as to produce the decorative medium MC (FIG. 4, etc.). That is, the image formation apparatus 1 prints the color toner image PL directly to the front surface the medium M, which is a flat surface, so that the color toner image PL can be formed flat regardless of whether or not there is a step between the background region AB and the decorative region AC in the lustrous toner image PS.

In other words, the image formation apparatus 1 can print (produce) the decorative medium MC which can appropriately hide the decorative region AC in the printed decorative medium MC, thereby avoiding the decorative region AC from being viewed in a manner different from the intended appearance, and thereby providing a good visual effect to the user.

The image formation apparatus 1 can generate image data in which the print duty D is appropriately set for each of the portion corresponding to the background region AB and the portion corresponding to the decorative region AC based on the control of the controller 3, and perform, at the silver image formation unit 10S, the exposure processing, the development processing, or the like based on the generated image data. That is, the image formation apparatus 1 can easily produce the decorative medium MC that provides a good visual effect, by using a well-known mechanism that is configured to form or print a toner image of a lustrous color such as a silver color toner, without using special (dedicated) parts or the like that are configured to produce the decorative medium MC.

According to the above configuration, the image formation apparatus 1 according to a first embodiment prints the color toner image PL on the front surface of the medium M, and prints the lustrous toner image PS on the back surface, so as to produce the decorative medium MC. At this time, the image formation apparatus 1 is configured to control the duty difference between the background print duty DB and the decorative print duty DC in the lustrous toner image PS to be in the range of 18.75% or more and 37.50% or less, and the ratio of the decorative print duty DC relative to the background print duty DB to be in the range of 62.50% or more and 81.25% or less. Thus, the image formation apparatus 1 can provide a good visual effect in which the decorative region AC on the back surface side of the decorative medium MC is appearing and disappearing, when the position and angle relationship between the user's viewpoint VP, the light source LS, and the decorative medium MC change in various ways.

2. Second Embodiment

An image formation apparatus 201 according to a second embodiment is configured the same as or similar to the image formation apparatus according to a first embodiment except that the image formation apparatus 201 includes a controller 203 instead of the controller 3. The controller 203 is configured to perform processes partially different from the controller 3 according to a first embodiment, so as to create (i.e. print) a decorative medium.

Figure 11:
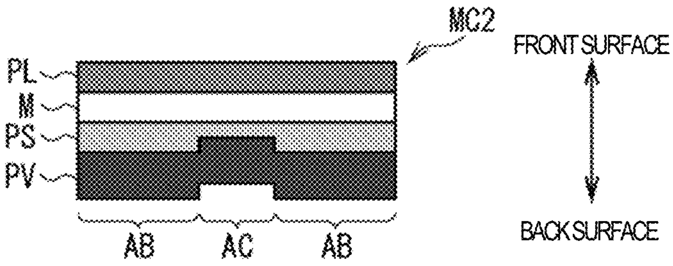
FIG. 11 is a schematic diagram illustrating a configuration of a decorative medium according to a second embodiment.

Specifically, the image formation apparatus according to a second embodiment is configured to create a decorative medium MC2 such as being illustrated in a schematic cross-sectional view of FIG. 11, instead of the decorative medium MC explained in a first embodiment (FIG. 4, etc.). The decorative medium MC2 according to a second embodiment includes a color toner image PL on a front surface side of a medium M and a lustrous toner image PS on a back surface side of the medium M in the same manner as or similar manner to the decorative medium MC according to a first embodiment, and further includes a coating toner image PV (hereinafter may be referred to as a coating image) superimposed on the back surface side of the medium M.

The coating toner image PV is formed of the black color toner TK by the black image formation unit 10K (FIG. 1). The print duty of the coating toner image PV is constant in all portions thereof and thus the adhesion amount of the black toner TK per unit area is constant (for example, 0.50 mg/cm$^2$)

Figure 12:
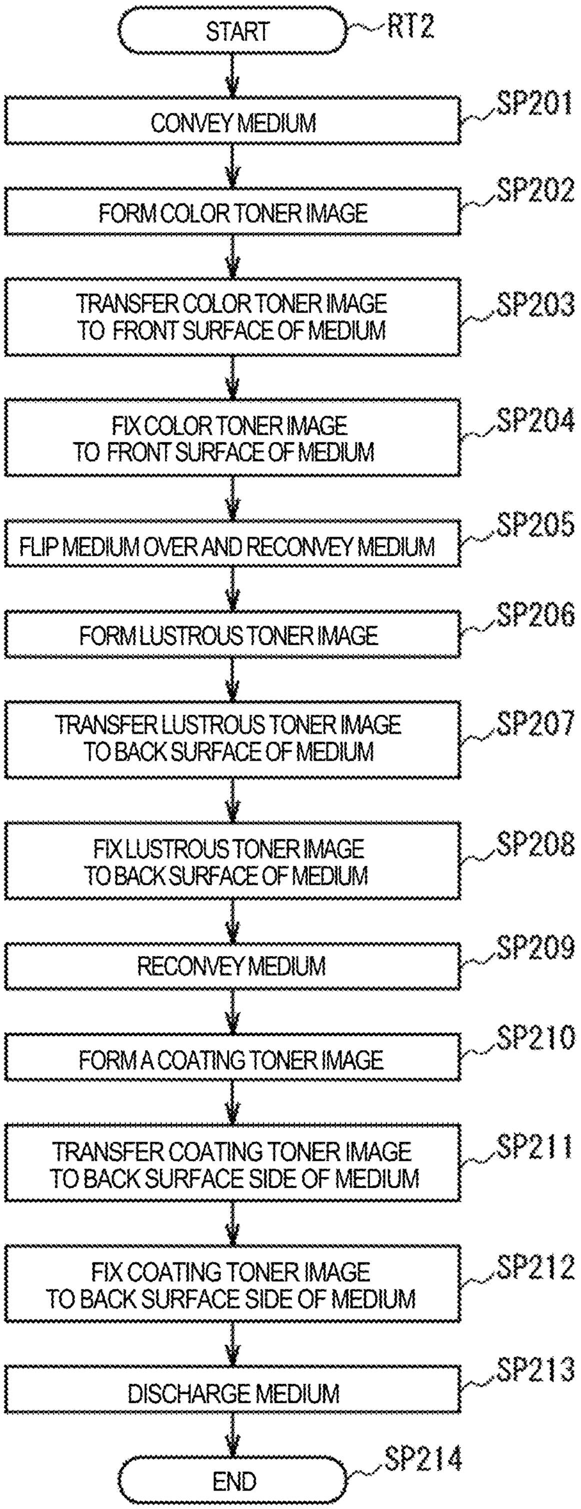
FIG. 12 is a flowchart illustrating a decorative medium printing process according to a second embodiment.

In a second embodiment, the image formation apparatus 201 is configured, based on the control of the controller 203, to create the decoration medium MC2 by performing processing partially different from that of a first embodiment. Specifically, when the controller 203 receives printing data from the external apparatus 100 (FIG. 3), the controller 203 starts a decorative medium printing processing procedure RT2 illustrated in FIG. 12, which is to be compared with FIG. 10, and moves to the first step SP201.

In step SP201 to SP208, the controller 203 performs processing same as steps SP1 to SP8 of the print processing routine RT1 (FIG. 110), and moves to the next step SP209. Thus, the controller 203 forms and fixes the color toner image PL on the front surface of the medium M, and forms and fixes the lustrous toner image PS on the back surface of the medium M.

In step SP209, the controller 203 returns the medium M to the conveyance path W without flipping over the medium M by the reconveyance section 66, and conveys the returned medium M along the conveyance path W, and then moves to the next step SP210. With this, the returned medium M is conveyed to the secondary transfer part 39 with the back surface of the medium M still facing the upper side (the side facing the intermediate transfer belt 34). In step SP210, the controller 203 controls the black (K) image formation unit 10K to form a coating toner image PV, which is to be printed on the back surface of the medium M, on the intermediate transfer belt 34, and moves to the next step SP211.

In step SP211, the controller 203 transfers the coating toner image PV from the intermediate transfer belt 34 onto the back surface of the medium M, that is, transfers the coating toner image PV on the lustrous toner image PS on the back surface of the medium M, by the secondary transfer part 39, and then moves to the next step SP212. In step SP212, the controller 203 fixes the coating toner image PV onto the back surface side of the medium M by the fixation device 60, and moves to the next step SP213. At this time, the heat and pressure from the fixation device 60 is applied to not only the lustrous toner image PS on the back surface of the medium M but also the color toner image PL on the front surface of the medium M, and thus the surface of the color toner image PL on the front surface of the medium M is smoothed more.

In step SP213, the controller 203 conveys the medium M along the conveyance path W by the medium discharge section 70 to discharge the medium M through the discharge port 76 to the discharged media tray 2T, and moves to the next step SP214 to terminate the decorative medium printing processing procedure RT2. As a result, the image formation apparatus 201 prints the color toner image PL on the front surface of the medium M and the lustrous toner image PS and the coating toner image PV on the back surface of the medium M, so as to produce the decorative medium MC2 (FIG. 11).

Without overlaying the black paper MK like a first embodiment, the decorative medium MC2 thus created can provide a visual effect in which the decorative region AC on the back surface side of the decorative medium MC2 is appearing and disappearing, depending on the position and angle relationship between the user's viewpoint VP, the light source LS, and the decorative medium MC2.

The image formation apparatus 201 can use the existing black (K) image formation unit 10K to print the coating toner image PV of the black (K) toner, and also can use the existing reconveyance section 66. Accordingly, the image formation apparatus 201 according to a second embodiment can produce the decorative medium MC2 by the control of the controller 203 changed from the control of the controller 3 according to a first embodiment, without adding components, etc., or changing the structure of the image formation apparatus from a first embodiment.

In other respects, the image formation apparatus 201 according to a second embodiment provides effects same as or similar to those of the image formation apparatus 1 according to a first embodiment.

3. Third Embodiment

An image formation apparatus 301 according to a third embodiment is configured the same as or similar to the image formation apparatus according to a first embodiment except that the image formation apparatus 301 includes a controller 303 instead of the controller 3. The controller 303 is configured to perform processes partially different from the controller 3 according to a first embodiment, so as to create (i.e. print) a decorative medium.

Figure 13:
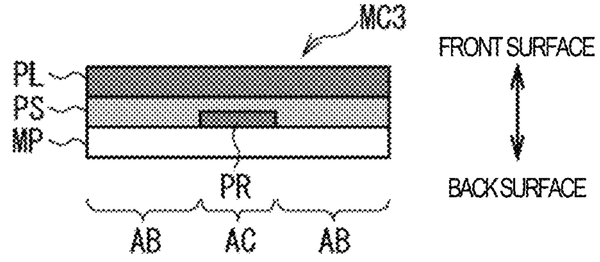
FIG. 13 is a schematic diagram illustrating a configuration of a decorative medium according to a third embodiment.

Specifically, the image formation apparatus according to a third embodiment is configured to create a decorative medium MC3 such as being illustrated in a schematic cross-sectional view of FIG. 13, instead of the decorative medium MC explained in a first embodiment (FIG. 4, etc.). Compared with the decorative medium MC according to a first embodiment, the decorative medium MC3 according to a third embodiment differs in that, a paper medium MP is used in place of the transparent medium M of the decorative medium MC according to a first embodiment, and includes a correction toner image PR (hereinafter may be referred to as a correction image) printed on a front surface of the paper medium MP and a lustrous toner image PS and a color toner image PL sequentially printed over the correction toner image PR on the front surface of the paper medium MP.

Since the paper medium MP is so-called high-quality paper, unlike the medium M used in first and second embodiments described above, and thus does not have the transparent property of transmitting visible light. The correction toner image PR is formed of a normal color (i.e., non-lustrous color) toner in an area same as an area in which the decorative region AC of the lustrous toner image PS to be printed on the paper medium MP. The print duty D of the correction toner image PR is adjusted to a value corresponding to the difference value between the background print duty DB and the decorative print duty DC in the lustrous toner image PS (i.e., the duty difference in Table TBL1 (FIG. 7)). Incidentally, in an embodiment, the correction toner image PR is composed of the cyan (C) toner as in the color toner image PL.

Accordingly, at the time when the lustrous toner image PS is printed on top of the correction toner image PR after the correction tonner image PR is printed on the front surface of the paper medium MP, the surface of the correction toner image PR becomes generally flat. Therefore, at the time when the color toner image PL is printed over the correction toner image PR for producing the decorative medium MC3, the surface of the color toner image PL is finished generally flat without a step formed along the boundary between the decorative region AC and the background region AB of the lustrous toner image PS.

Figure 14:
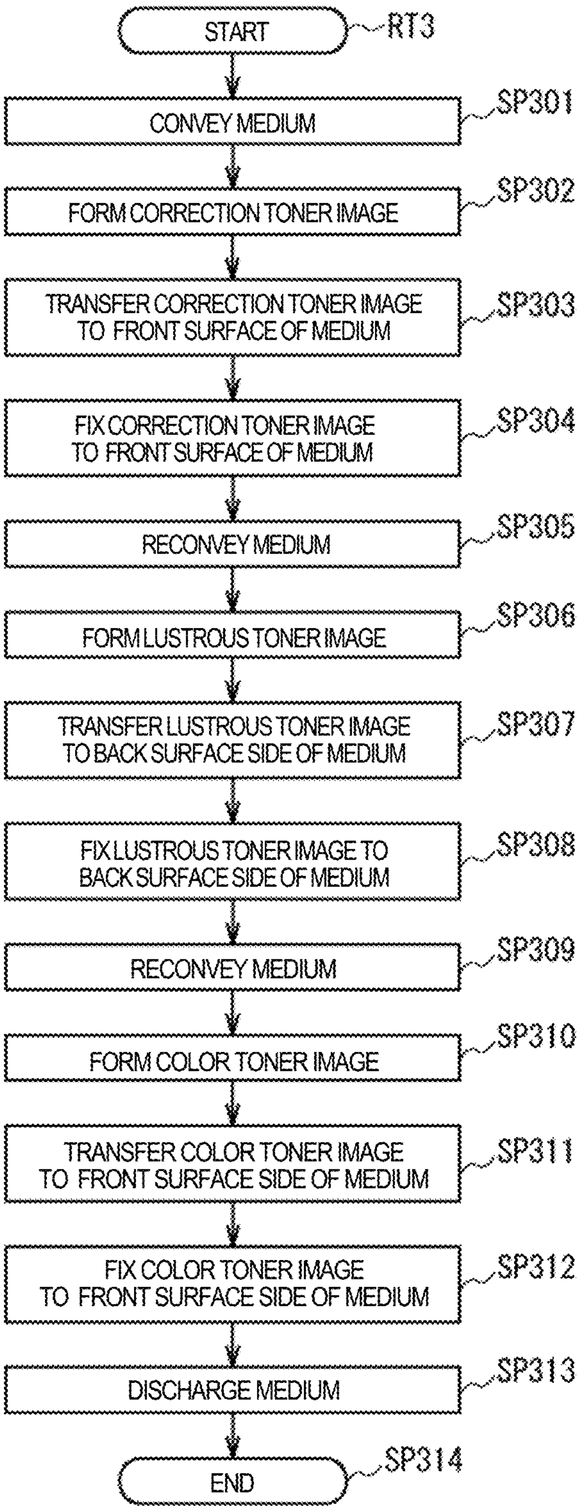
FIG. 14 is a flowchart illustrating a decorative medium printing process according to a third embodiment.

In a third embodiment, the image formation apparatus 301 is configured, based on the control of the controller 303, to produce the decoration medium MC3 by performing processing partially different from that of a first embodiment. Specifically, when the controller 303 receives printing data from the external apparatus 100 (FIG. 3), the controller 203 starts a decorative medium printing processing procedure RT3 illustrated in FIG. 14, which is to be compared with FIG. 10, and moves to the first step SP301.

In step SP301, as in step SP1 (FIG. 1) of the decorative medium printing processing procedure RT1, the controller 303 feeds one sheet of paper media M from the media cassette 41 by the first medium feeder 40 and conveys the fed paper medium M along the conveyance path W, and then moves to the next step SP302. Thus, the paper medium MP is conveyed to the secondary transfer part 39 with a front surface of the medium M facing the upper side (the side facing the intermediate transfer belt 34).

In step SP302, based on the received printing data, the controller 303 controls the normal color image formation units 10 (10K, 10C, 10M, and 10Y) to form a correction toner image PR using a normal color toner, in an area same as a decorative region AC of the lustrous toner image PS, on the intermediate transfer belt 34 (FIGS. 1 and 2), and moves to the next step SP303. In this case, the controller 303 adjusts the print duty D of the correction toner image PR to a value same as the difference value between the background print duty DB and the decorative print duty DC in the lustrous toner image PS.

In step SP303, the controller 303 transfers the correction toner image PR from the intermediate transfer belt 34 to the front surface of the paper medium MP by the secondary transfer part 39, and moves to the next step SP304. In step SP304, the controller 303 fixes the correction toner image PR to the front surface of the paper medium MP by the fixation device 60 and moves to the next step SP305.

In step SP305, the controller 303 returns the paper medium MP to the conveyance path W without flipping over the paper medium MP by the reconveyance section 66, and conveys the returned paper medium MP along the conveyance path W, and then moves to the next step SP306. With this, the returned paper medium MP is conveyed to the secondary transfer part 39 with the front surface of the medium M still facing the upper side (the side facing the intermediate transfer belt 34).

In step SP306, the controller 303 controls, based on the received printing data, the silver color image formation unit 10S to form a lustrous toner image PS on the intermediate transfer belt 34, and then moves to the next step SP307. At this time, based on the received printing data, the controller 303 forms the lustrous toner image PS (FIG. 4) that includes a background region AB and a decorative region AC. Also at this time, the controller 303 controls a background print duty DB of the background region AB to be 100%, and a decorative print duty DC of the decorative region AC to be in the range of 62.50% or more and 81.25% or less.

In step SP307, the controller 203 transfers the lustrous toner image PS from the intermediate transfer belt 34 to the front surface side of the paper medium MP by the secondary transfer part 39, that is, superimposes the lustrous toner image PS on top of the correction toner image PR, and moves to the next step SP308. In step SP308, the controller 303 fixes the lustrous toner image PS to the front surface side of the paper medium MP by the fixation device 60 and moves to the next step SP309. At this time, the surface of the correction toner image PR become generally flat.

In step SP309, as in step SP305, the controller 303 returns the paper medium MP to the conveyance path W without flipping over the paper medium MP by the reconveyance section 66, and conveys the returned paper medium MP along the conveyance path W, and then moves to the next step SP310. With this, the returned paper medium MP is conveyed to the secondary transfer part 39 with the front surface of the medium M still facing the upper side (the side facing the intermediate transfer belt 34).

In step SP310, the controller 303 controls, based on the received printing data, the normal color image formation units 10 (10K, 10C, 10M, and 10Y) to form a color toner image PL, which is to be printed on the front surface side of the medium MP, on the intermediate transfer belt 34 (FIGS. 1 and 2), and moves to the next step SP311.

In step SP311, the controller 303 transfers the color toner image PL from the intermediate transfer belt 34 to the front surface side of the paper medium MP by the secondary transfer part 39, that is, superimposes the color toner image PL on top of the lustrous toner image PS, and moves to the next step SP312. In step SP312, the controller 303 fixes the color toner image PL to the front surface side of the paper medium MP by the fixation device 60 and moves to the next step SP313.

In step SP313, the controller 303 conveys the medium M along the conveyance path W by the medium discharge section 70 to discharge the medium M through the discharge port 76 to the discharged media tray 2T, and moves to the next step SP314 to terminate the decorative medium printing processing procedure RT3. As a result, the image formation apparatus 301 sequentially prints the correction toner image PR, the lustrous toner image PS, and the color toner image PL superimposed in that order on the front surface of the paper medium MP, to thereby create the decorative medium MC3 (FIG. 13).

The decorative medium MC3 thus created can provide a visual effect same as or similar to that of a first embodiment, with using the paper media MP, which may be a general high quality paper, without using the transparent medium M having the property of transmitting visible light.

Further, the image formation apparatus 301 can utilize the normal color image formation units 10 to form and print the correction toner image PR of the normal color toner, and can also utilize the reconveyance section 66. Accordingly, the image formation apparatus 301 according to a third embodiment can produce the decorative medium MC3 by the control of the controller 303 different from the control of the controller 3 according to a first embodiment, without adding components, etc., or changing the structure of the image formation apparatus from a first embodiment.

In other respects, the image formation apparatus 301 according to a third embodiment can achieve effects same as or similar to those of the image formation apparatus 1 according to a first embodiment.

4. Other Embodiments

Figure 15A:
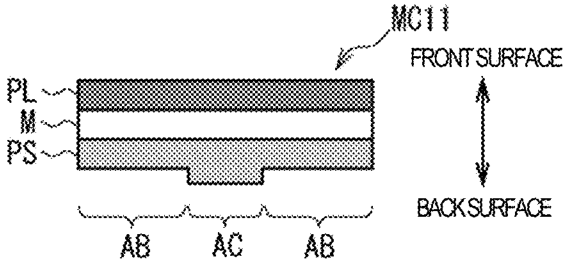
FIGS. 15A, 15B, and 15C are schematic diagrams each illustrating a configuration of a decorative medium according to another embodiment.
Figure 15B:
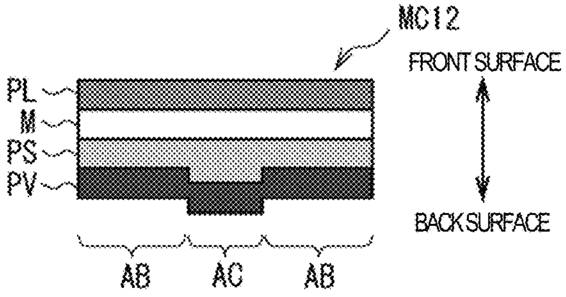
Figure 15C:
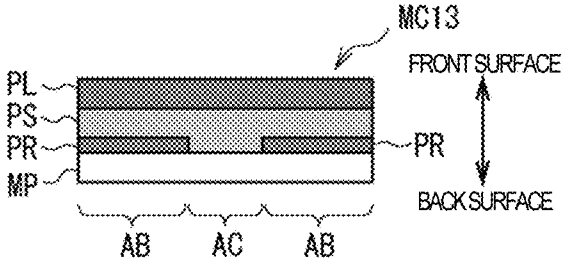

In a first embodiment described above, the case has been described in which the background print duty DB of the background region AB in the lustrous toner image PS is 100% and the decorative print duty DC of the decorative region AC is 62.50% or more and 81.25% or less, that is, the decorative print duty DC is set lower than the background print duty DB. However, the invention is not limited thereto. For example, such as being illustrated as a decorative medium MC11 illustrated in FIG. 15A, which is to be compared with the decorative medium MC illustrated in FIG. 4A, the decorative print duty DC of the decorative region AC may be set higher than the background print duty DB of the background region AB. Further a modification of a second embodiment, such as being illustrated as a decorative medium MC12 illustrated in FIG. 15B, which is to be compared to the decorative medium illustrated in FIG. 11, the decorative print duty DC of the decorative region AC may be set higher than the background print duty DB of the background region AB. Further, as a modification of a third embodiment, such as being illustrated as a decorative medium MC13 illustrated in FIG. 15C, which is to be compared to the decorative medium illustrated in FIG. 13, the decorative print duty DC of the decorative region AC may be set higher than the background print duty DB of the background region AB. In this case, it may be sufficient that the correction toner image PR is formed in the area same as the background region AB, which is the area having the lower print duty.

In a first embodiment described above, the case has been described in which the amount of the lustrous toner image PS formed on the medium (the toner adhesion amount on the medium) when the background print duty DB is 100% is set to 0.65 mg/cm$^2$. However, the invention is not limited thereto. For example, the toner adhesion amount on medium for the lustrous toner image PS when the background print duty DB is 100% may be in a range of 0.50 to 0.80 mg/cm$^2$. In this case, it is possible to obtain a same or similar effects, by setting the difference in the toner amount on the medium between the background region AB and the decorated region AC to be 0.12 mg/cm$^2$ or more 0.24 mg/cm$^2$ or less, or setting the ratio of the toner amount on the medium of the decorative region AC to the toner amount on the medium of the background region AB to be in the range of 0.63 or more and 0.82 or less. Further, the toner adhesion amount of the color toner image PL (cyan image), which is to be printed on the front surface of the medium M, is not limited to 0.45 mg/cm$^2$, for example, may be a value in the range from 0.35 to 0.55 mg/cm$^2$. In this case, it is also possible to obtain the same or similar effects. The same applies to second and third embodiments described above.

In a first embodiment described above, the case has been described in which the duty difference between the background print duty DB and the decorative print duty DC is set in the range of 18.75% or more and 37.50% or less and the ratio of the decorative print duty DC to the background print duty DB is set in the range of 62.50% or more and 81.25% or less. However, the invention is not limited thereto. For example, it may be sufficient to satisfy only one of the conditions of: the duty difference between the background print duty DB and the decorative print duty DC is set in the range of 18.75% or more and 37.50% or less; and the ratio of the decorative print duty DC to the background print duty DB is set in the range of 62.50% or more and 81.25% or less. Alternatively, for example, a combination may be sufficient to satisfy only one of the conditions of: the difference in the zero-degree reflectance (Y value) between the background region AB and the decorative region AC is in the range of 1.53 or more and 5.79 or less; the difference in the luminous reflectance difference $\Delta Y$ between the background region AB and the decorative region AC is in the range of 8 or more and 14 or less; and the reduction rate in the luminous reflectance difference $\Delta Y$ of the decorative region AC relative to the background region AB is in the range of 22% or more and 39% or less. The same applies to second and third embodiments described above.

Further, in a first embodiment described above, the case has been described in which the print duty D of the lustrous toner image PS has a two-stage configuration having the background print duty DB and the decorative print duty DC. However, the invention is not limited thereto. For example, the print duty D of the lustrous toner image PS may have three or more stage configuration. The same applies to second and third embodiments described above.

Further, in a first embodiment described above, the case has been described in which the lustrous toner image PS of the decorative medium MC (FIG. 4) is formed of the silver color toner (silver toner TS). However, the invention is not limited thereto. For example, the lustrous toner image PS may be formed of toner of any lustrous color such as gold color, copper color, and the like. For example, the gold color toner can be manufactured by changing a part of the manufacturing process of the silver color toner TS described in a first embodiment. Specifically, such a gold color toner can be produced by adding a yellow pigment (for example, C.I. Pigment Yellow 180 as an organic pigment), a magenta pigment (for example, C.I. Pigment Red 122 as an organic pigment), lustrous red-orange fluorescent dye (for example, FM-34N_Orange (made by Shinrohi Corporation)), and yellow fluorescent dye (for example, FM-35N_Yellow (made by Shinrohi Corporation)), when adding aluminum powder as a lustrous pigment. Also, the lustrous pigment is not limited to aluminum (Al), for example, may be any lustrous pigment such as pearl pigment (natural mica), inorganic pigment by titanium oxide, and the like. The same applies to second and third embodiments described above.

Further, in a first embodiment described above, the case has been described in which the color toner image PL of the decorative medium MC (FIG. 4) is formed of the toner of cyan (C) with the print duty of 100%. However, the invention is not limited thereto. For example, the color toner image PL may be configured of toner of any color such as black (K), magenta (M), yellow (Y), white, etc., or a combination thereof. That is, it may be sufficient that the color toner image PL is an image using non-lustrous toner. The same applies to second and third embodiments described above. The same applies to the correction toner image PR in a third embodiment.

Figure 17:
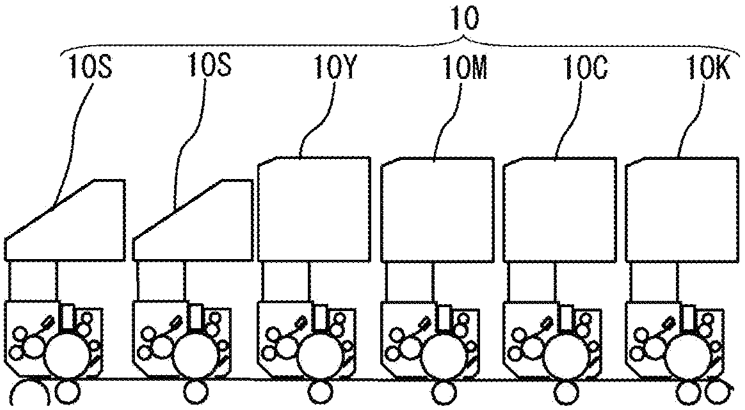
FIG. 17 is a schematic diagram illustrating a configuration of image formation units including first and second lustrous image formation units.

In a first embodiment described above, a case has been described in which only one image formation unit 10S configured to form the lustrous color (e.g., silver color) toner image is provided in the image formation apparatus 1 and the image formation unit 10S forms the lustrous toner image PS such that the lustrous toner image PS includes the background region AB and the decorative region AC, in which the background print duty DB of the background region AB and the decorative print duty DC of the decorative region AC are different from each other. However, the invention is not limited thereto. For example, as illustrated in FIG. 17, two lustrous color (such as silver color) image formation units 10S may be provided in the image formation apparatus 1. In this case, for example, one of the image formation unit 10S (hereinafter referred to as a first lustrous image formation unit) may form an image of the background region AB (hereinafter referred to as a first lustrous image) and the other image formation unit 10S (hereinafter referred to as a second lustrous image formation unit) may form an image of the decorative region AC (hereinafter referred to as a second lustrous image). Alternatively, for example, one of the image formation units 10S may form an image of an entire region which covers the background region AB and the decorated region AC, and the other image formation unit 10S may only form an image of the background region AB overlapping the image of the entire region.

In these cases, it may be sufficient that the amount of the adhered lustrous toner (e.g., silver toner TS) per unit area is appropriately different between the background region AB and the decorative region AC of the lustrous toner image PS on the medium M. Specifically, a degree of exposure light (i.e., brightness, amount of light, etc.) per unit area at the time of exposure may be different between the two image formation units 10S, the bias voltages at the time of development or transfer may be different between the two image formation units 10S, or these may be suitably combined. Alternatively, the color, characteristics, etc. in the lustrous color toner may be different between the two image formation units 10S. In this case, as illustrated in Table TBL1, for example, a combination may be considered such that the difference in the zero-degrees reflectance (Y value) between the background region AB and the decorative region AC is in the range of 1.53 or more and 5.79 or less, or such that the difference in the luminous reflectance difference ΔY between the background region AB and the decorative region AC is in the range of 8 or more and 14 or less. Alternatively, for example, a combination may be considered such that the reduction rate in the luminous reflectance difference ΔY is in the range of 22% or more and 39% or less. The same applies to second and third embodiments described above.

Further, in a first embodiment described above, the case has been described in which the fixing temperature, which is the temperature at the time of fixing in the fixation device 60 is constant (for example, 150° C.), and the fixing temperature for fixing the color toner image PL and the fixing temperature for fixing the lustrous toner image PS are the same. However, the invention is not limited thereto. For example, the fixing temperature for fixing the color toner image PL may be any temperature that can fix the color toner image PL to the medium M and the fixing temperature for fixing the lustrous toner image PS may be any temperature that can fix the lustrous toner image PS to the medium M. Specifically, for example, the fixing temperature may be in the range of 145 to 190° C. Further, for example, the fixing temperature for the color toner image PL may be set higher than the fixing temperature for the lustrous toner image PS. Specifically, the fixing temperature for the lustrous toner image PS may be 150° C. and the fixing temperature for the color toner image PL may be 190° C., for example. In this case, it is possible to increase a degree of gloss on the front surface of the color toner image PL. The same applies to second and third embodiments described above.

Figure 10:
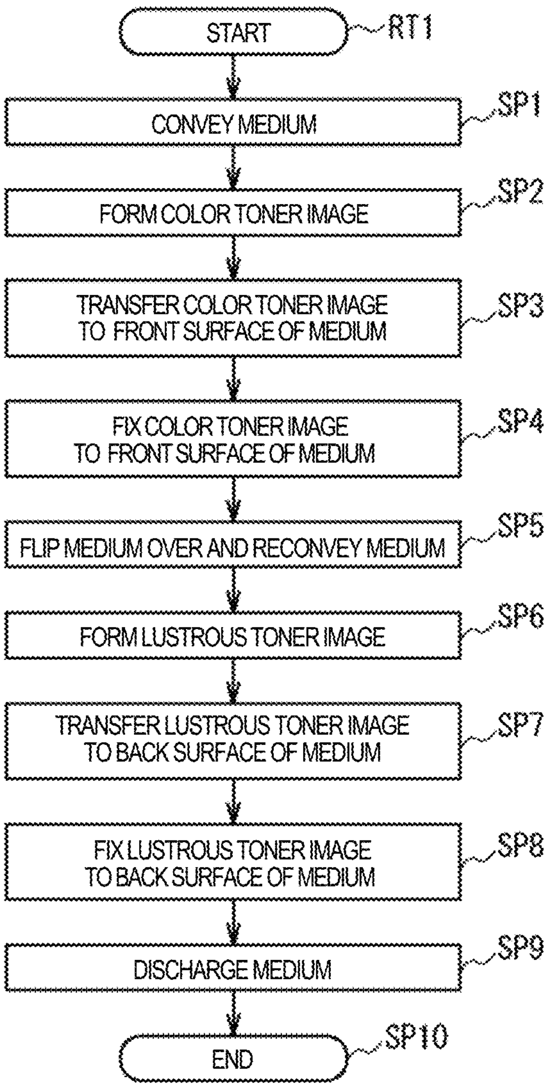
FIG. 10 is a flowchart illustrating a decorative medium printing process according to a first embodiment.

In a first embodiment described above, the case has been described in which, the color toner image PL is printed on the front surface of the medium M and then the lustrous toner image PS is printed on the back surface of the medium M, as illustrated in the decorative medium printing process procedure RT1 (FIG. 10). However, the invention is not limited thereto. For example, the color toner image PL may be printed on the front surface of the medium M after printing the lustrous toner image PS on the back surface of the medium M. The same applies to second and third embodiments described above.

Further, in a first embodiment, the case has been described in which the medium composed of a so-called transparent material having an extremely high transmittance of visible light, such as an OHP film, is used. However, the invention is not limited thereto. For example, a medium M composed of a colored material exhibiting any color as in a so-called color film or a colored medium M may be used, or a "translucent" medium M, such as a tracing paper or the like, whose transmittance of visible light is slightly inferior compared to the OHP film or the like may be used. That is, any medium M that is in the form of sheet having the property of transmitting at least a portion of visible light can be used. The same applies to second and third embodiments described above. Further, in the third embodiment, the paper media MP may be composed of any material capable of transferring and fixing a toner image.

Figure 16A:
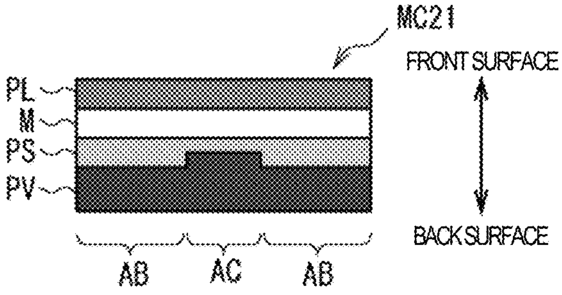
FIGS. 16A and 16B are schematic diagrams each illustrating a configuration of a decorative medium according to another embodiment.
Figure 16B:
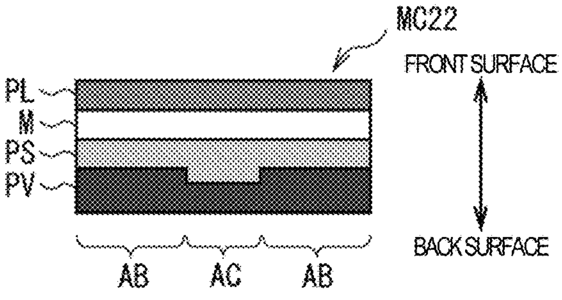

Further, in a second embodiment described above, the case has been described in which the print duty D is constant in all portions in the coating toner image PV superimposed on the lustrous toner image PS in the decorative medium MC2 (FIG. 11). However, the invention is not limited thereto. For example, such as being illustrated as a decorative medium MC21 illustrated in FIG. 16A, which is to be compared to FIG. 11, the coating toner image PV may have the print duty D in the decorative region AC higher than the print duty D in the background region AB. Further, when the lustrous toner image PS has the decorative print duty DC in the decorative region AC higher than the background print duty DB in the background region AB as in the decorative medium MC12 illustrated in FIG. 15B, the coating toner image PV may have the print duty D in the background region AB higher than the print duty D in the decorative region AC, such as being illustrated as the decorative medium MC22 illustrated in FIG. 16B. In these cases, it is possible to make the back surface of the coating toner image PV flat, so as to avoid a formation of a step on the surface of the coating toner image PV along the boundary between the background region AB and the decorative region AC. Accordingly, when a user sees the back surface of the decorative medium MC21 or MC22, the shape of the decorative region AC can be prevented from being recognized by the user.

Further, in a second embodiment described above, the case has been described in which the coating toner image PV is formed of the black toner TK. However, the invention is not limited thereto. For example, the cyan (C), magenta (M), and yellow (Y) toner T may be mixed to form a black toner such as a processed black toner. In addition, the color of the coating toner image PV is limited to the black color. For example, the color of the coating toner image PV may be any color such as a color of a single color toner such as a white color toner, or a color formed by a mixture of two or more color toner. In this case, it may be preferable that the toner adhesion amount per unit area of the coating toner image PV or the color of the coating toner image PV provides the property of blocking the visible light as much as possible. Furthermore, the transmittance of visible light through the coating toner image PV may be intentionally reduced by controlling the fixing temperature to be lower than normal when the fixation device 60 (FIG. 1) of the image formation apparatus 1 fixes the coating toner image PV.

In a second embodiment, the case has been described in which the fixation temperature at the fixation device 60 is constant (e.g., 150° C.) in all of the first fixing process for fixing the color toner image PL on the front surface of the medium M, the second fixing process for fixing the lustrous toner image PS on the back surface of the medium M, and the third fixing process for fixing the coating toner image PV on the back surface of the medium M. However, the invention is not limited thereto. For example, the fixing temperature in the third fixing process may be set to a temperate (for example, 140° C.) lower than those in the first and second fixing processes. With this, it is possible to reduce the smoothness of the surface of the coating toner image PV to reduce the transmittance of the visible light therethrough, thereby enhancing the coating effect. In addition, the color toner image PL and the lustrous toner image PS may be transferred on the front surface of the medium M with being superimposed with each other and fixed to the front surface of the medium M together by a single fixing process.

In a third embodiment described above, the case has been described in which, such as being explained in the decorative medium printing process procedure RT3 (FIG. 14), the correction toner image PR, the lustrous toner image PS, and the color toner image PL are individually formed, transferred, and fixed. However, the invention is not limited thereto. For example, the correction toner image PR and the lustrous toner image PS may be collectively formed on the intermediate transfer belt 34 and collectively transferred and fixed to the medium, or the lustrous toner image PS and the color toner image PL may be collectively formed on the intermediate transfer belt 34 and collectively transferred and fixed to the medium. In these cases, a combination may be adapted that allows the images PR and PS or the images PR and PL are superimposed in accordance with the arrangement order of the image formation units 10 along the conveyance path in the image formation apparatus 1 (FIG. 1) and the traveling direction of the intermediate transfer belt 34. The same applies to the lustrous toner image PS and the coating toner image PV in a second embodiment.

In a first embodiment described above, the case has been described in which the reconveyance section 66 is provided in the image formation apparatus 1 (FIG. 1), and the image formation apparatus 1 forms and fixes the color toner image PL on the front surface of the medium M, returns the medium M to the conveyance path W with reversing the front and back surfaces of the medium M by the reconveyance section 66, and forms and fixes the lustrous toner image PS on the back surface of the medium M. However, the invention is not limited thereto. For example, the reconveyance section 66 may be omitted from the image formation apparatus 1, and the image format ion apparatus 1 may form and fix the color toner image PL on the front surface of the medium M, and then discharge the medium M through the discharge port 76 to the discharge tray 2T by the medium discharge section 70. In this case, a user may set the discharged medium M to the media cassette 41 or the media tray 51 again with the front and back surfaces of the medium M reversed, so as to make the image formation apparatus 1 to form the lustrous toner image PS on the back surface of the medium M. Further in this case, for example, the image formation apparatus 1 may be configured, when the printing of the color toner image PL on the front surface of the medium M is finished, to display on the display 4 a message, such as "Please set the discharged medium in the medium cassette with the medium flipped over" or the like, that prompts the user to set the medium M in the media cassette 41 or the media tray 51 with the front and back surfaces of the medium M being reversed. The same applies to second and third embodiments described above.

Further, in a first embodiment, the case has been described in which the five image formation units 10 are provided in the image formation apparatus 1 (FIG. 1). However, the invention is not limited thereto. For example, the image formation apparatus 1 may be provided with less than five image formation units 10 or with more than five image formation units 10. The same applies to second and third embodiments described above.

Further, in a first embodiment described above, the case has been described in which the image formation apparatus (FIG. 1) is of a so-called intermediate transfer method configured to primarily transfer a toner image formed by the image formation units 10 to the intermediate transfer belt 34, and secondarily transfer the toner image from the intermediate transfer belt 34 to the medium M. However, the invention is not limited thereto. For example, the image formation apparatus may be of a so-called direct transfer method configured to directly transfer a toner image formed by the image formation units 10 to the medium M. The same applies to second and third embodiments described above.

Further, in one or more embodiments described above, the case has been described in which the invention is applied to the image formation apparatus 1 configured to form an image with the developer of the one-component development method. However, the invention is not limited thereto, and the invention may be applied to an image formation apparatus that forms an image with a developer of a two-component development method in which a carrier and a toner is mixed and an appropriate amount of charge is provided to the toner by utilization of friction between the carrier and the toner. Note that, when the two-component development method is used, particles including lustrous pigment, binding resin and external additive or powder in which the particles are mixed are defined as a lustrous toner or a lustrous developer. The same applies to second and third embodiments described above.

Further, in a first embodiment, the case has been described where the invention is applied to the image formation apparatus 1, which is a single function printer. However, the invention is not limited thereto. For example, the disclosure may be applied to an image formation apparatus having another function, such as a copier, a facsimile, or the like, or an MFP (Multi-Function Peripheral) having functions of a copier, a facsimile, and the like.

Further, the invention is not limited to one or more embodiments and modifications described above. That is, the application range of the invention covers embodiments obtained by arbitrarily combining some of or all of one or more embodiments and modifications described above. The scope of the invention also extends to an embodiment in which a part of the configuration in any one of one or more embodiments and modifications described above that is extracted is replaced or diverted with a part of the configuration of any one of one or more embodiments and modifications, or an embodiment in which the extracted part is added to any of one or more embodiments and modifications described above.

Further, in a first embodiment described above, the case has been described in which the image formation apparatus 1 serving as an image formation apparatus is configured to include the image formation unit 10C serving as a non-lustrous image formation unit, the image formation unit 10S serving as a lustrous image formation unit, and the controller 3 serving as a controller. However, the invention is not limited thereto. For example, the image formation apparatus may include a non-lustrous image formation unit, a lustrous image formation unit, and a controller that are configured in any other configurations.

The disclosure may be used for forming an image on a medium using a developer containing a metallic pigment by an electrophotographic method.

The invention claimed is:

1. An image formation apparatus comprising:

a storage storing a decorative medium printing program;

a non-lustrous image formation unit configured to form a non-lustrous image of a non-lustrous developer;

a lustrous image formation unit configured to form a lustrous image of a lustrous developer comprising metallic pigment;

a conveyance path that extends from a medium feeder to a discharge port through a transfer part at which the non-lustrous image and the lustrous image are transferred to a transparent medium;

a reconveyance mechanism including a reconveyance path and configured to return the transparent medium from downstream to upstream of the transfer part with the transparent medium being flipped over; and a controller configured to control, based on printing data, the non-lustrous image formation unit, the lustrous image formation unit, and the reconveyance mechanism, wherein the decorative medium printing program controls, when executed by the controller, (i) the non-lustrous image formation unit to form the non-lustrous image on a first surface of the transparent medium, the reconveyance mechanism to return the transparent medium from downstream to upstream of the transfer part with the transparent medium being flipped over, and the lustrous image formation unit to form the lustrous image including a first region and a second region on a second surface, which is an opposite surface of the first surface, or (ii) the lustrous image formation unit to form the lustrous image including the first region and the second region on the second surface, the reconveyance mechanism to return the transparent medium from downstream to upstream of the transfer part with the transparent medium being flipped over, and the non-lustrous image formation unit to form the non-lustrous image on the first surface of the transparent medium, thereby obtaining the transparent medium that comprises the non-lustrous image on the first surface and the lustrous image on the first region and the second region of the second surface, such that a difference between a first adhesion ratio and a second adhesion ratio is 18.75% or more and 37.50% or less, where the first adhesion ratio is an amount of the lustrous developer adhered to the transparent medium per unit area in the first region of the second surface, and the second adhesion ratio is an amount of the lustrous developer adhered to the transparent medium per unit area in the second region of the second surface.

2. The image formation apparatus according to claim 1, wherein the decorative medium printing program controls, when executed by the controller, the first adhesion ratio and the second adhesion ratio such that a difference of a luminous reflectance in each of the first region and the second region of the lustrous image is 1.53% or more and 5.79% or less.

3. The image formation apparatus according to claim 1, wherein the decorative medium printing program controls, when executed by the controller, the non-lustrous image formation unit to form a coating image formed of the non-lustrous developer overlapping with the non-lustrous image on the second surface of the transparent medium.

4. The image formation apparatus according to claim 3, wherein the decorative medium printing program controls, when executed by the controller, the non-lustrous image formation unit to form the coating image formed of the non-lustrous developer of black or white color.

5. The image formation apparatus according to claim 4, further comprising:

a fixation device configured to fix the non-lustrous image and the lustrous image formed on the transparent medium to the transparent medium, at a fixation temperature based on the control of the controller, wherein the decorative medium printing program controls, when executed by the controller, the fixation temperature when fixing the coating image to be lower than that when fixing the non-lustrous image or the lustrous image.

6. The image formation apparatus according to claim 1, further comprising:

a fixation device configured to fix the non-lustrous image and the lustrous image formed on the transparent medium to the transparent medium, based on control of the controller, wherein the decorative medium printing program controls, when executed by the controller, the non-lustrous image formation unit to form the non-lustrous image on the first surface of the transparent medium and the fixation device to fix the non-lustrous image to the transparent medium, the reconveyance mechanism to return the transparent medium from downstream to upstream of the transfer part with the transparent medium being flipped over, and then control the lustrous image formation unit to form the lustrous image on the second surface of the transparent medium and the fixation device to fix the lustrous image to the transparent medium.

7. The image formation apparatus according to claim 1, wherein the lustrous image formation unit configured to expose an image carrier with exposure light emitted from an exposure device to form an electrostatic latent image on the image carrier, and develop the electrostatic latent image with the lustrous developer to form the lustrous image, and the decorative medium printing program controls, when executed by the controller, the lustrous image formation unit to form the lustrous image such that a degree of the exposure light per unit area is different between the first region and the second region.

8. The image formation apparatus according to claim 1, wherein the lustrous image formation unit comprises:

a first lustrous image formation unit configured to form a first lustrous image on the second surface of the transparent medium at a third adhesion ratio; and a second lustrous image formation unit configured to form a second lustrous image on the second surface of the transparent medium at a fourth adhesion ratio different from the third adhesion ratio for the first lustrous image, wherein the decorative medium printing program controls, when executed by the controller, the first lustrous image formation unit and the second lustrous image formation unit to form the lustrous image including the first region formed at the first adhesion ratio and the second region formed at the second adhesion ratio, by combining the first lustrous image formed at the third adhesion ratio and the second lustrous image formed at the fourth adhesion ratio.

9. The image formation apparatus according to claim 8, wherein the decorative medium printing program controls, when executed by the controller, the first lustrous image formation unit to form the first region of the lustrous image at the first adhesion ratio by forming the first lustrous image at the third adhesion ratio being equal to the first adhesion ratio and the second lustrous image formation unit to form the second region of the lustrous image by forming the second lustrous image at the fourth adhesion ratio being equal to the second adhesion ratio.

10. The image formation apparatus according to claim 8, wherein the decorative medium printing program controls, when executed by the controller, the first lustrous image formation unit to form the first lustrous image at the third adhesion ratio in an area corresponding to the first region and the second region of the lustrous image, and the second lustrous image formation unit to form the second lustrous image at the fourth adhesion ratio in an area corresponding to the first region of the lustrous image overlapping with the first lustrous image.

11. The image formation apparatus according to claim 8, wherein the decorative medium printing program controls, when executed by the controller, the first lustrous image formation unit and the second lustrous image formation unit such that a bias voltage applied when developing the lustrous developer by the first lustrous image formation unit and a bias voltage applied when developing the lustrous developer by the second lustrous image formation unit are different from each other.

12. The image formation apparatus according to claim 8, wherein the decorative medium printing program controls, when executed by the controller, the first lustrous image formation unit and the second lustrous image formation unit such that a degree of exposure light per unit area when performing exposure processing by the first lustrous image formation unit and a degree of exposure light per unit area when performing exposure processing by the second lustrous image formation unit are different from each other.

13. An image formation method performed by an image formation apparatus when executing a decorative medium printing program, the image formation method comprising:

forming, by a non-lustrous image formation unit, a non-lustrous image of a non-lustrous developer on a first surface of a transparent medium;

before or after the forming of the non-lustrous image, forming, by a lustrous image formation unit, a lustrous image of a lustrous developer comprising a metallic pigment including a first region and a second region on a second surface that is an opposite surface of the first surface of the transparent medium; and after forming one of the non-lustrous image and the lustrous image and before forming the other of the non-lustrous image and the lustrous image, flipping over the transparent medium by a reconveyance mechanism of the image formation apparatus, wherein in the forming of the lustrous image, a difference between a first adhesion ratio and a second adhesion ratio is 18.75% or more and 37.50% or less, where the first adhesion ratio is an amount of the lustrous developer adhered to the transparent medium per unit area in the first region, and the second adhesion ratio is an amount of the lustrous developer adhered to the transparent medium per unit area in the second region.

14. An image formation apparatus comprising:

a storage storing a decorative medium printing program;

a first image formation unit configured to form a first image of a non-lustrous developer;

a second image formation unit configured to form a second image of a lustrous developer comprising a metallic pigment;

a conveyance path that extends from a medium feeder to a discharge port through a transfer part at which the first image and the second image are transferred to a transparent medium which is a transparent medium;

a reconveyance mechanism including a reconveyance path and configured to return the transparent medium from downstream to upstream of the transfer part with the transparent medium being flipped over; and a controller configured to control, based on printing data, the first image formation unit and the second image formation unit, and the reconveyance mechanism, wherein the decorative medium printing program controls, when executed by the controller, (i) the first image formation unit to form the first image on a first surface of the transparent medium, the reconveyance mechanism to return the transparent medium from downstream to upstream of the transfer part with the transparent medium being flipped over, and the second image formation unit to form the second image including a first region and a second region on a second surface of the transparent medium, which is an opposite surface of the first surface of the transparent medium, or (ii) the second image formation unit to form the second image including the first region and the second region on the second surface, the reconveyance mechanism to return the transparent medium from downstream to upstream of the transfer part with the transparent medium being flipped over, and the first image formation unit to form the first image on the first surface of the transparent medium, thereby obtaining the transparent medium that comprises the first image on the first surface and the second image on the first region and the second region of the second surface, such that a ratio of a second adhesion ratio to a first adhesion ratio is 62.50% or more and 81.25% or less, where the first adhesion ratio is an amount of the lustrous developer adhered to the transparent medium per unit area in the first region of the second surface, and the second adhesion ratio is an amount of the lustrous developer adhered to the transparent medium per unit area in the second region of the second surface.

15. An image formation method performed by an image formation apparatus by executing a decorative medium printing program, the image formation method comprising:

forming, by a non-lustrous image formation unit, a non-lustrous image of a non-lustrous developer on a first surface of a transparent medium;

before or after the forming of the non-lustrous image, forming, by a lustrous image formation unit, a lustrous image of a lustrous developer comprising a metallic pigment including a first region and a second region on a second surface that is an opposite surface of the first surface of the transparent medium; and after forming one of the non-lustrous image and the lustrous image and before forming the other of the non-lustrous image and the lustrous image, flipping over the transparent medium by a reconveyance mechanism of the image formation apparatus, wherein in the forming of the lustrous image, a rate of a second adhesion ratio to a first adhesion ratio is 62.50% or more and 81.25% or less, where the first adhesion ratio is an amount of the lustrous developer adhered to the transparent medium per unit area in the first region, and the second adhesion ratio is an amount of the lustrous developer adhered to the transparent medium per unit area in the second region.

16. An image formation apparatus comprising:

a non-lustrous image formation unit configured to form a non-lustrous image and a correction image of a non-lustrous developer on a medium;

a lustrous image formation unit configured to form a lustrous image of a lustrous developer on the medium; and a controller configured to control, based on printing data, the non-lustrous image formation unit and the lustrous image formation unit, wherein the controller is configured to control the non-lustrous image formation unit to form the correction image in a second region excluding a first region on a surface of the medium, and control the lustrous image formation unit to form the lustrous image including the first region and the second region superimposed on the correction image on the surface of the medium, and control the non-lustrous image formation unit to form the non-lustrous image superimposed on the lustrous image, such that a difference of a second adhesion ratio from a first adhesion ratio is set to 18.75% or more and 37.50% or less and an adhesion ratio of the correction image is set to a value same as the difference, where the first adhesion ratio is an amount of the lustrous developer adhered to the medium per unit area in the first region, and the second adhesion ratio is an amount of the lustrous developer adhered to the medium per unit area in the second region.

* * * * *